(12) United States Patent
Samona et al.

(10) Patent No.: US 12,062,240 B2
(45) Date of Patent: Aug. 13, 2024

(54) MONITORING SYSTEM

(71) Applicant: VergeIQ, LLC, Redmond, WA (US)

(72) Inventors: Ricky Samona, Seattle, WA (US); Christopher Benham, Broomfield, CO (US)

(73) Assignee: VergeIQ, LLC, Redmond, WA (US)

( * ) Notice: Subject to any disclaimer, the term of this patent is extended or adjusted under 35 U.S.C. 154(b) by 137 days.

(21) Appl. No.: 17/477,661

(22) Filed: Sep. 17, 2021

(65) Prior Publication Data

US 2022/0083790 A1 Mar. 17, 2022

Related U.S. Application Data

(60) Provisional application No. 63/173,681, filed on Apr. 12, 2021, provisional application No. 63/079,548, filed on Sep. 17, 2020.

(51) Int. Cl.
| | |
|---|---|
| *G06V 20/56* | (2022.01) |
| *B62J 45/416* | (2020.01) |
| *B62J 45/422* | (2020.01) |
| *B62M 6/80* | (2010.01) |
| *G06N 20/00* | (2019.01) |
| *G06V 20/13* | (2022.01) |

(52) U.S. Cl.
CPC ........... *G06V 20/56* (2022.01); *B62J 45/416* (2020.02); *B62J 45/422* (2020.02); *B62M 6/80* (2013.01); *G06N 20/00* (2019.01); *G06V 20/13* (2022.01); *G06V 2201/00* (2022.01)

(58) Field of Classification Search
CPC .... G06V 20/56; G06V 20/13; G06V 2201/00; G06N 20/00; B62J 45/416; B62J 45/422; B62M 6/80
USPC ....................................................... 348/143
See application file for complete search history.

(56) References Cited

U.S. PATENT DOCUMENTS

| | | | |
|---|---|---|---|
| 7,350,787 B2 | 4/2008 | Voss | |
| 8,364,389 B2 | 1/2013 | Dorogusker et al. | |
| 10,429,192 B2 | 10/2019 | Kitchel | |
| 11,328,603 B1* | 5/2022 | Paran | ...................... G06V 20/53 |
| 2017/0008584 A1* | 1/2017 | Butora | ..................... B62J 50/22 |
| 2017/0024369 A1 | 1/2017 | Seagraves et al. | |
| 2017/0144724 A1* | 5/2017 | Murugesan | .......... B62J 45/4152 |
| 2018/0075747 A1* | 3/2018 | Pahwa | .................. B60W 40/10 |
| 2019/0250619 A1* | 8/2019 | Gillett | .................... B62K 23/02 |

(Continued)

FOREIGN PATENT DOCUMENTS

| | | | |
|---|---|---|---|
| CN | 206880170 U | * | 1/2018 |
| EP | 3166087 | | 5/2017 |
| JP | 2011176646 A | * | 9/2011 |

(Continued)

*Primary Examiner* — Mohamed A. Wasel
(74) *Attorney, Agent, or Firm* — Dority & Manning, P.A.

(57) ABSTRACT

A monitoring system can include an electronic device operably coupled with a vehicle. One or more sensors operably can be operably coupled with the electronic device. A user interface can be operably coupled with the electronic device. A controller can be operably coupled with the electronic device. The controller can be configured to receive data from the one or more sensors and provide an instruction to the electronic device based on the data from the one or more sensors, wherein the instruction is related to mitigating an upcoming information of interest along a route.

20 Claims, 14 Drawing Sheets

(56) References Cited

U.S. PATENT DOCUMENTS

2021/0215496 A1* 7/2021 Sese .................. G01C 21/3697
2022/0063672 A1* 3/2022 Corbett ............. B60W 60/0016

FOREIGN PATENT DOCUMENTS

| JP | 2019/217978 | 12/2019 |
| WO | WO 2018/017100 | 1/2018 |
| WO | WO 2020/012006 | 1/2020 |

* cited by examiner

MONITORING SYSTEM

CROSS-REFERENCE TO RELATED APPLICATIONS

This application is a non-provisional application claiming the benefit of priority under 35 U.S.C. § 119(e) to U.S. Provisional Application No. 63/079,548, filed Sep. 17, 2020, and entitled "MONITORING SYSTEM", and U.S. Provisional Application No. 63/173,681, filed Apr. 12, 2021, and entitled "MONITORING SYSTEM", which are both hereby incorporated by reference in their entirety.

FIELD OF THE INVENTION

The present disclosure generally relates to a monitoring system for providing various types of information to a user of the monitoring system.

BACKGROUND OF THE INVENTION

When utilizing different vehicle types, such as bicycles, various hazards may be traversed by a user. Many hazards may be experienced by multiple users who traverse a common route. Therefore, it is desired to provide information regarding the traversal of the various hazards by initial users to subsequent users.

SUMMARY OF THE INVENTION

Aspects and advantages of the disclosure will be set forth in part in the following description, or may be obvious from the description, or may be learned through practice of any of the aspects of the present disclosure.

According to some aspects of the present disclosure, a monitoring system includes an electronic device operably coupled with a bicycle. One or more sensors is operably coupled with the electronic device. A user interface is operably coupled with the electronic device. A controller is operably coupled with the electronic device. The controller is configured to receive data from the one or more sensors and provide an instruction to the electronic device based on the data from the one or more sensors. The instruction is related to mitigating is configured to mitigate an upcoming hazard along a route.

According to some aspects of the present disclosure, a monitoring system includes an electronic device operably coupled with a bicycle. One or more sensors is operably coupled with the electronic device. A controller is operably coupled with the electronic device. The controller is configured to receive data from the one or more sensors as the bicycle traverses a route and correlates the route to an operation routine for a training system based on the data received from the one or more sensors.

According to some aspects of the present disclosure, a monitoring system includes an electronic device operably coupled with a bicycle. A positioning device is operably coupled with the electronic device. A user interface is operably coupled with the electronic device. A controller is operably coupled with the electronic device and a database for storing data received from one or more sensors. The controller is configured to receive a location of the bicycle from the positioning device, determine one or more upcoming terrain features based on the location of the bicycle from the positioning device and the data received from one or more sensors, and display information related to the upcoming one or more upcoming terrain features on the user interface.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, directed to one of ordinary skill in the art, is set forth in the specification, which makes reference to the appended figures, in which.

Figure 1:
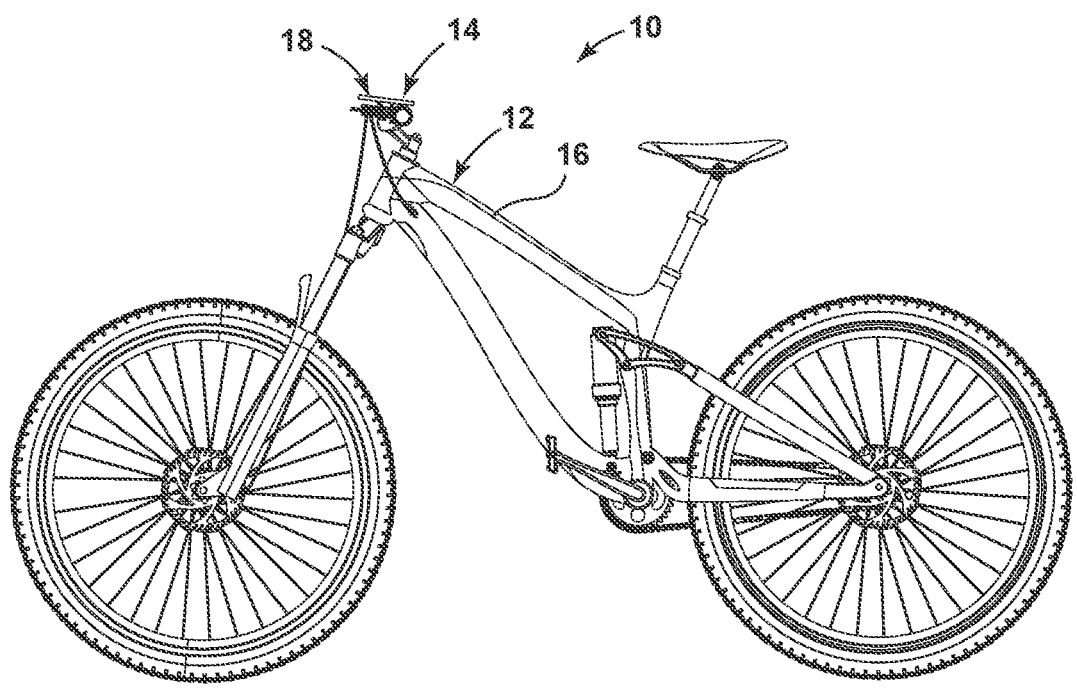
FIG. 1 is a side plan view of a vehicle configured as a bicycle in accordance with aspects of the present subject matter.

Repeat use of reference characters in the present specification and drawings is intended to represent the same or analogous features or elements of the present disclosure.

DETAILED DESCRIPTION

As required, detailed examples of the present invention are disclosed herein. However, it is to be understood that the disclosed examples are merely an example of the invention that may be embodied in various and alternative forms. The figures are not necessarily to a detailed design and some schematics may be exaggerated or minimized to show a function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

For purposes of description herein, the terms "upper," "lower," "right," "left," "rear," "front," "vertical," "horizontal," and derivatives thereof shall relate to the embodiment of the invention as oriented in FIG. 1. However, it is to be understood that the invention may assume various alternative orientations, except where expressly specified to the contrary. It is also to be understood that the specific devices and processes illustrated in the attached drawings and described in the following specification are simply examples of the inventive concepts defined in the appended claims. Hence, specific dimensions and other physical characteristics relating to the examples disclosed herein are not to be considered as limiting, unless the claims expressly state otherwise.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a flow of matter. For example, "upstream" refers to the direction from which matter flows, and "downstream" refers to the direction to which the matter moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, a monitoring system and related methods are provided herein. The monitoring system can include an electronic device operably coupled with a vehicle. One or more sensors can be operably coupled with the electronic device and/or the vehicle. The one or more sensors may be configured output data indicative of any information of interest, such as, but not limited to, a hazard, possible hazards, condition, activity, event, occurrence, and/or situation associated with the vehicle or the environment in which the vehicle operating (e.g., as the vehicle 12 traverses a route), was operated (e.g., after the vehicle traverses a route), and/or is to be operated.

In some instances, a user interface can be operably coupled with the electronic device. The user interface can include a display, input circuitry, lights, speakers, haptic devices. The user interface may be capable of displaying information related to the current route, upcoming possible hazards, mitigation instructions, and/or any other information.

In various examples, a controller can be operably coupled with an electronic device. The controller can be configured to receive data from the one or more sensors. In turn, the controller may also provide an instruction to the electronic device based on the data from the one or more sensors, wherein the instruction is related to mitigating an upcoming hazard along a route. Additionally or alternatively, the controller may be configured to receive data from the one or more sensors as the bicycle traverses a route and correlate the route to an operation routine for a training system based on the data received from the one or more sensors.

In addition, the monitoring system may further include a positioning device operably coupled with the electronic device. In some instances, the controller may be operably coupled with the electronic device and a database for storing data received from one or more sensors. In such instances, the controller may be configured to receive a location of the vehicle from the positioning device, determine one or more upcoming terrain features based on the location of the vehicle from the positioning device and the data received from one or more sensors, and display information related to the upcoming terrain on the user interface. As used herein, a terrain feature is any feature of a terrain that may be of interest to a user.

In further examples, the monitoring system may alter one or more components of the vehicle through a control device to adapt the vehicle to the terrain and/or the user capabilities. In various instances, the controller may alter the one or more components based on manual input resulting in a user-actuated experience. Additionally or alternatively, the monitoring system may be capable of adjusting the one or more components based on previously captured and/or current sensor data from any of the one or more sensors in a semi-adaptive (e.g., with minimal user intervention, such as accepting a proposed alteration) and/or adaptive experience (e.g., with no user intervention). In some embodiments, certain components and/or geometry may be user-selected or predefined to be user-actuated, semi-adaptive, and/or adaptive.

Figure 2:
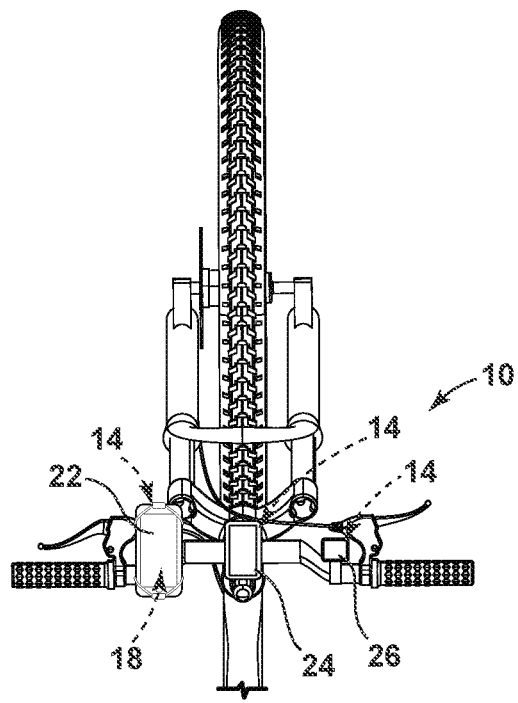
FIG. 2 is a top perspective view of the bicycle of FIG. 1 including one or more sensors operably coupled with the bicycle in accordance with aspects of the present subject matter.

Referring now to the drawings, wherein identical numerals indicate the same elements throughout the figures, FIGS. 1 and 2 generally illustrate a monitoring system 10 that may include a vehicle 12 having one or more sensors 14 operably coupled therewith. The vehicle 12 may be configured as a bicycle 16 or any other type of vehicle, including e-bicycles, motorcycles, scooters, cars, trucks, buses, skis, snowboards, skateboards, one or multi-wheeled electric vehicles such as scooters/skateboards/other, snowmobiles, off-road vehicles, and the like. The vehicle 12 may be configured as a bicycle 16 or any other type of vehicle, including e-bicycles, motorcycles, scooters, cars, trucks, buses, skis, snowboards, skateboards, one or multi-wheeled vehicles, one or multi-wheeled scooters or skateboards, snowmobiles, off-road vehicles, and the like. Additionally or alternatively, the monitoring system 10 provided herein may be used by pedestrians, runners, hikers, and so forth.

The one or more sensors 14 may be configured output data indicative of any information of interest, such as, but not limited to, a hazard, possible hazards, condition, activity, event, occurrence, and/or situation associated with the vehicle 12 or the environment in which the vehicle 12 is operating (e.g., as the vehicle 12 traverses a route), was operated (e.g., after the vehicle 12 traverses a route), and/or is to be operated. Example information of interest includes, but is not limited to, obstacles (e.g., bumps, roots, rocks), turns, terrain variations, speed (or changes in speed), acceleration (or changes in acceleration), road conditions (e.g., potholes, road construction, poor street lighting, poor lane markings, heavy vehicle traffic, heavy pedestrian traffic, dangerous intersections, accidents, potential accidents, construction zones), unsanitary items (i.e. syringe, excrement), high crime areas, areas of unrest, storm drains, common water retention areas, sudden braking of the bicycle 16, swerving of the bicycle 16, sudden acceleration of the bicycle 16, bicycle tire slippage, and the like) that may hinder both usage of the vehicle 12 and/or movement of the user 20 without the vehicle 12 or a vehicle at all (such as through hiking, running, walking, jogging, etc.). Any information of interest may further include a time of operation, an altitude, weather, and/or any other conditions.

Figure 5:
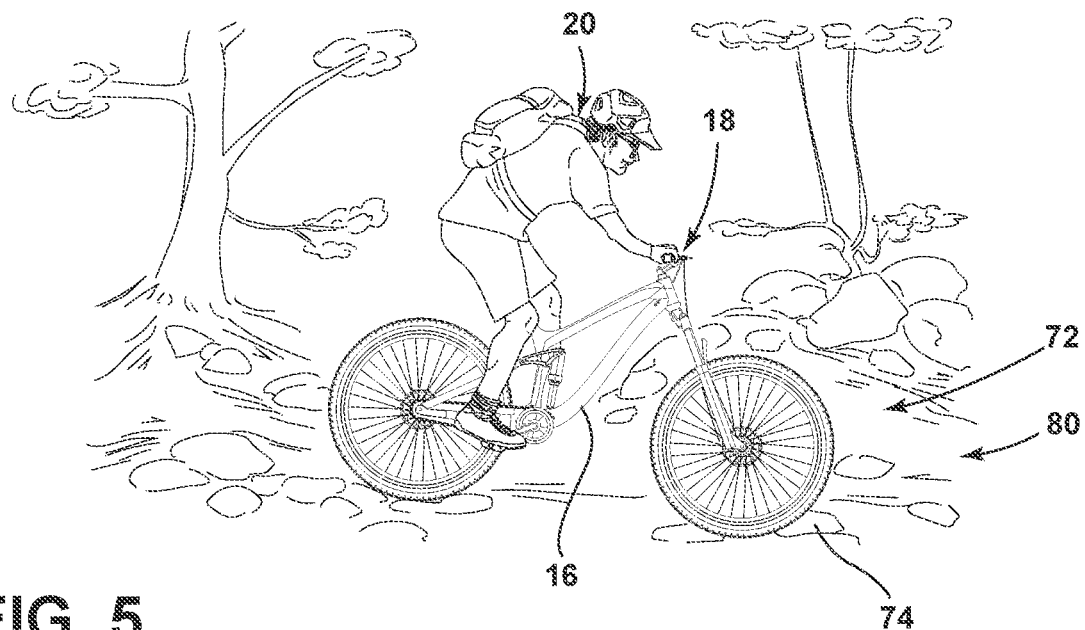
FIG. 5 is a side perspective view of a user traversing various obstacles in accordance with aspects of the present subject matter.
Figure 6:
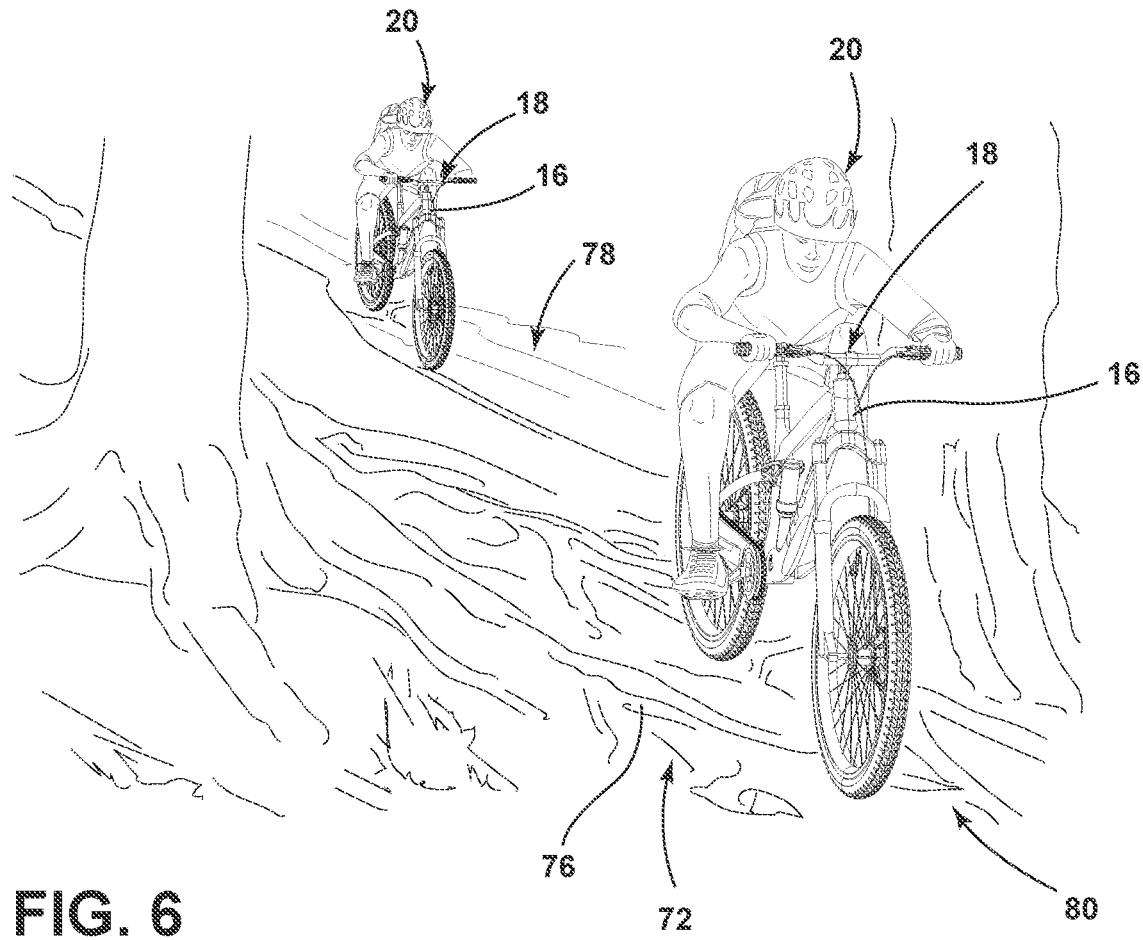
FIG. 6 is a front perspective view of the user traversing various obstacles in accordance with aspects of the present subject matter.

In various embodiments, the one or more sensors 14 may be within an electronic device 18 that may be supported by the vehicle 12 and/or a user 20 (FIG. 5). For instance, the one or more sensors 14 may be integrated within a cellular device 22 and/or a bicycle computer 24 that may be removably attached to the vehicle 12. Additionally or alternatively, the one or more sensors 14 may be a stand-alone device 26 that may be coupled with any portion of the vehicle 12 and/or the user 20 of the vehicle 12. The one or more sensors 14, in combination with the electronic device 18 may detect, track, and/or record the information of interest. The detection, tracking, and/or the recording of the conditions may occur either automatically and/or be manually entered (including but not limited via touch, audio, and or neural chip interface) by a user 20 through a user interface 52 of the electronic device 18. For example, the user interface 52 may include one or more buttons that is activated by a user 20 (e.g., a user 20 of the bicycle 16) to manually identify a condition and/or possible hazards or the user 20 verbally noting a condition (e.g. a user sees a dangerous storm drain and rides around it while noting to the user interface 52 that there is a dangerous condition) or vice versa. Furthermore, the information of interest may relate to off-trail activities, including but not limited to main roadways and cities. For example, information of interest may include a construction zone, unsanitary items (i.e. syringe, excrement), high crime areas, areas of unrest, pedestrian or vehicle traffic/congestion, storm drains, common water retention areas, or any other information. In some instances, the one or more sensors 14 may be used to confirm the entered condition or possible hazards and/or stored data from the manually identified condition or possible hazards for later automatic detection of a similar condition or possible hazards. Both automatic and manual logging may include additional details including but not limited to a day, location, and timestamp. In addition, both automatic and manual logging may include user-submitted images, videos, and/or audio provided real-time (during a ride), post-ride, and/or post-feature (i.e. ride a feature, stop, and add images, videos, and/or audio).

Figure 3:
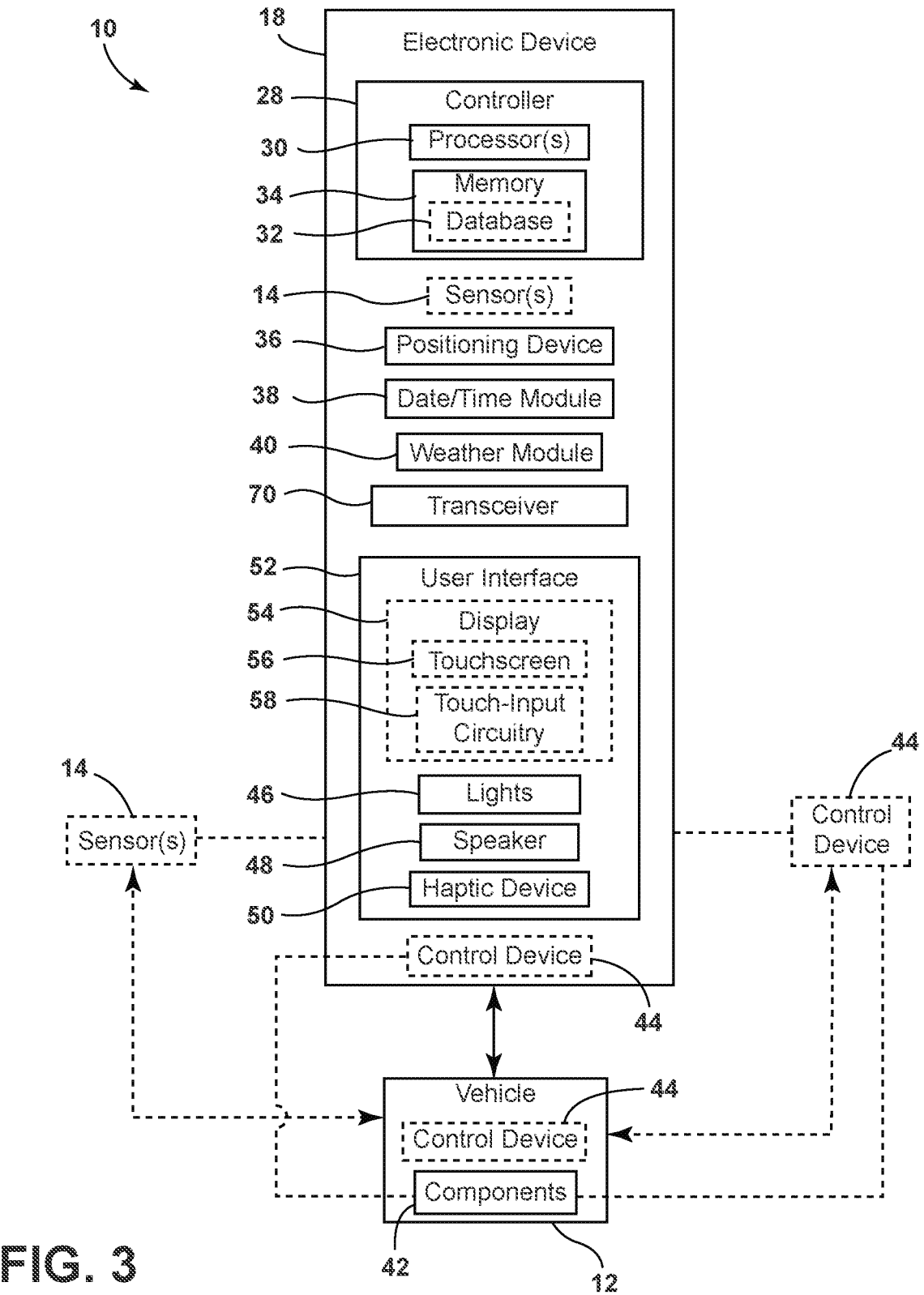
FIG. 3 is a block diagram of an electronic device operably coupled with the one or more sensors in accordance with aspects of the present subject matter.

Referring now to FIG. 3, as provided above, the electronic device 18 may be a cellular device 22, bicycle computer 24, stand-alone sensor device. Additionally or alternatively, the electronic device 18 may be a helmet, visor operably coupled with a helmet, mobile communication device, key fob, wearable device (e.g., fitness band, watch, glasses, goggles, jewelry, wallet), apparel (e.g., a tee-shirt, gloves, shoes, or other accessories), personal digital assistant, headphones, and/or other devices that include capabilities for interacting with one or more sensors 14.

In some examples, the electronic device 18 may be a neural chip that may interface with living tissue through the use of electrodes to receive neurological impulses and turn them into voltage readings or signals. Some example solutions utilize electrodes that contact the outside of the brain or rest on the outside of the skull. Some example solutions utilize electrodes implanted into the brain tissue itself. In any arrangement, it may be useful to utilize many different electrodes, placed all over a brain, in order to cover as much of the brain as possible to sense as many neurological readings as possible. In some example arrangements, electrodes are arranged on a strand or lead and connect to an independent computer chip. The electrodes sense neurological impulses as voltage signals and pass that information to the chips which handle the data. In one example embodiment described, such chips are customized application-specific integrated circuit (ASIC) chips that are connected to a strand or strands with electrodes attached to them.

In some instances, the electronic device 18 may include one or more processor-based devices, such as a given controller or computing device or any suitable combination of controllers or computing devices. Thus, in several embodiments, the electronic device 18 may include one or more processor(s) 30, and the associated memory device(s) 32 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application-specific integrated circuit, and other programmable circuits. Additionally, the memory device(s) 32 of the electronic device 18 may generally comprise memory element(s) including, but not limited to, a computer-readable medium (e.g., random access memory RAM)), a computer-readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 32 may generally be configured to store suitable computer-readable instructions that, when implemented by the processor(s) 30, configure the electronic device 18 to perform various computer-implemented functions, such as one or more aspects of the methods and algorithms that will be described herein. In addition, the electronic device 18 may also include various other suitable components, such as a communications circuit or module, one or more input/output channels, a data/control bus, and/or the like.

In various examples, the methods and algorithms can be implemented using a machine learning engine (MLE) that utilizes one or several machine learning techniques including, for example, decision tree learning, including, for example, random forest or conditional inference trees methods; neural networks; support vector machines; clustering; and Bayesian networks. These algorithms can include computer-executable code that can be retrieved by the memory 32 and/or a remote server 60 (FIG. 4) through a network/cloud 62 (FIG. 4) and used to generate a predictive evaluation of the information of interest. The algorithms may provide unique data to a predefined group or individual user based on their common or individual characteristics. As such, in some instances, a first instruction or a second instruction, and the machine learning engine can be configured to provide the first instruction to a first individual based on data related to a characteristic and a second instruction to a second individual based on the data related to the characteristic In various examples, the processor 30 or an individual may classify information of interest based on various defined features. For example, for terrain-related information, the defined features can include, but are not limited to, a terrain's size (e.g., size of the hill, size of the jump, etc.), a technical risk level, probability of crashes, difficulty, and more. Each of the defined features may be based on a developed standard and approved methodology using any combination of numbers, letters, and/or other characters and specific to a single or set of terrain features and/or an entire course. For instance, each feature may be classified based on a terrain type-size (or severity)-ease of mitigation. For example, a "J1A" could be a Jump-Small-Easy to Mitigate. Inversely, an "O3B" could be an Obstruction-Large-Medium to Mitigate. It will be appreciated that such standard and approved methodology may be applied to any other type of information of interest without departing from the scope of the present disclosure.

In several instances, the various types of information of interest described above could be captured during the use of the monitoring system 10. Each set of data related to the information of interest can be manually analyzed to associate each real-world information of interest with a risk score. That set of data (the combination of real-world information of interest with associated risk score) can then be utilized as a set of training data used to train an MLE to perform an automated evaluation of information of interest to determine a risk score associated with the environment. For instance, the MLE may be trained using the set of data by extracting particular features out of the set of data. For example, if road cyclists are logging a dangerous intersection regularly on specific days (e.g., Monday-Friday) between specific times (e.g., 7 am-9 am and 4 pm-6 pm) and not as often midday (even with a weighted average of users), the MLE may determine that the hazard is likely due to rush hour traffic exacerbating the danger and associate a risk score with such conditions and/or in specific locations. In addition, if there are slow downs or intermittent stoppages during specific times, the MLE may determine that there is notable traffic. The traffic data provided to the monitoring system may be provided from any remote source (e.g., any source that is physically separated from the electronic device 18, the user, and/or otherwise not position dependent based on movement of the vehicle 12).

Similarly, if automatic logging captures one or more crashes or adverse conditions during a defined time, the MLE may associate a risk score with the use of the monitoring system 10 during the defined time, which may be provided to the user as an alert for the user to be cautious. Further, while mountain biking, speed, and weather may play some of the larger correlated roles in crashes and mitigation. It will be appreciated that any other circumstance that may be monitored can be provided to the monitoring system 10 and the processor 30 may determine a risk assessment for information of interest that relates to each specific user of the monitoring system 10. The information of interest generated for each specific user may be based on previous riding data, inputted data (rider's height, vehicle type and/or specifications, etc.), data related to common riders based on body types or common skill levels, and/or any other practicable data.

The MLE may also be utilized on a per-user level, including but not limited to correlations on features the user does well on and/or does not do well on (e.g. if a user does poorly on jumps, the MLE would understand this and possibly over-index on mitigation for jumps), biometric correlations (i.e. if a user starts a ride with a higher than normal heart rate), specific correlations for the user 20 (i.e. if a user rides better on Saturday mornings than they do after a 10 hour day at work during the work week), temperature (i.e. if a user doesn't ride well if it is too cold since their hands get cold), and/or captured data from sensors. In addition to this, the information and MLE may reference and correlate to other users with similar attributes (e.g. if the user 20 is tall, and other tall users perform poorly on tight turns), the MLE may determine the correlation. In addition, the neural network may pre-emptively notify a user if they are pushing the limits of their current fitness, mental, and/or technical abilities.

Additionally or alternatively, the MLE can correlate fitness and mental to technical abilities. For example, a user might perform better on a feature (e.g., jumps) when they are well-rested during the first portion of a time period in which the monitoring system is utilized (e.g., the first 30 min or any other time period) but perform poorly once the time is exceeded. Based on what it knows of the user (heart rate, technical capabilities, day of the week, time, etc.), the monitoring system can notify the user if they are about to traverse features that exceed their abilities—before or during a ride. In some instances, the monitoring system may allow for a user to select a ride based on the accumulated data regarding the user.

In some instances, the monitoring system 10 may also allow for gamification during usage that allows the methods and algorithms to challenge the user to improve skills to enable future trails requiring those additional skills. For example, the monitoring system 10 might provide that a user should ride a predefined number of additional miles and successfully traverse a predefined number of additional jumps before doing a specific trail. The suggested preparation may be based on the user's characteristics, the trail data, correlation of data from other users who have ridden that trail, and/or any other practicable data. For example, status bars and levels for each category of data may be used to categorize each user. Furthermore, there may be correlations across other dynamics, including but not limited to selected vehicle types (e.g. hard-tail bicycles may perform differently on certain terrain features and therefore require different guidance for that user, and electric scooters may perform differently than road bicycles).

In some embodiments, a park or location may classify each of their downhill and/or other courses either through an electronic device 18 and/or through a computing device 68. The mapped paths may be correlated to a user's profile, which may be accomplished through the network/cloud 62. Based on the proven skills of the user, the monitoring system 10 can alert the rider to the amount of risk they may experience. (i.e., a double black diamond downhill course).

Additionally or alternatively, in some embodiments, a park or location may receive data from the network/cloud 62. The data may provide the park or location with any information of interest and/or usage data. For example, the data may provide a number of users on each trail during a defined time period, a number of riders within a defined boundary, any hazards on a trail within the defined boundary, and/or any other information of interest. In turn, the park or location may be able to attend to any issues that are identified as information of interest and/or develop virtual rides of the various trails within the defined boundary.

It should be appreciated that the various functions of the electronic device 18 may be performed by a single processor-based device or may be distributed across any number of processor-based devices, in which instance such devices may be considered to form part of the electronic device 18. For instance, the functions of the electronic device 18 may be distributed across multiple application-specific controllers, such as a bicycle controller, a sensor controller, and/or the like.

In several embodiments, the memory device 32 may include a database 34 for storing data received from the one or more sensors 14, a positioning device 36, a date/time module 38, a weather module 40, or any other device. Moreover, in addition to initial or raw sensor data received from the one or more sensors 14, the positioning device, the date/time module 38, and/or the weather module 40, final or post-processing data (as well as any intermediate data created during data processing) may also be stored within the database 34.

Figure 4:
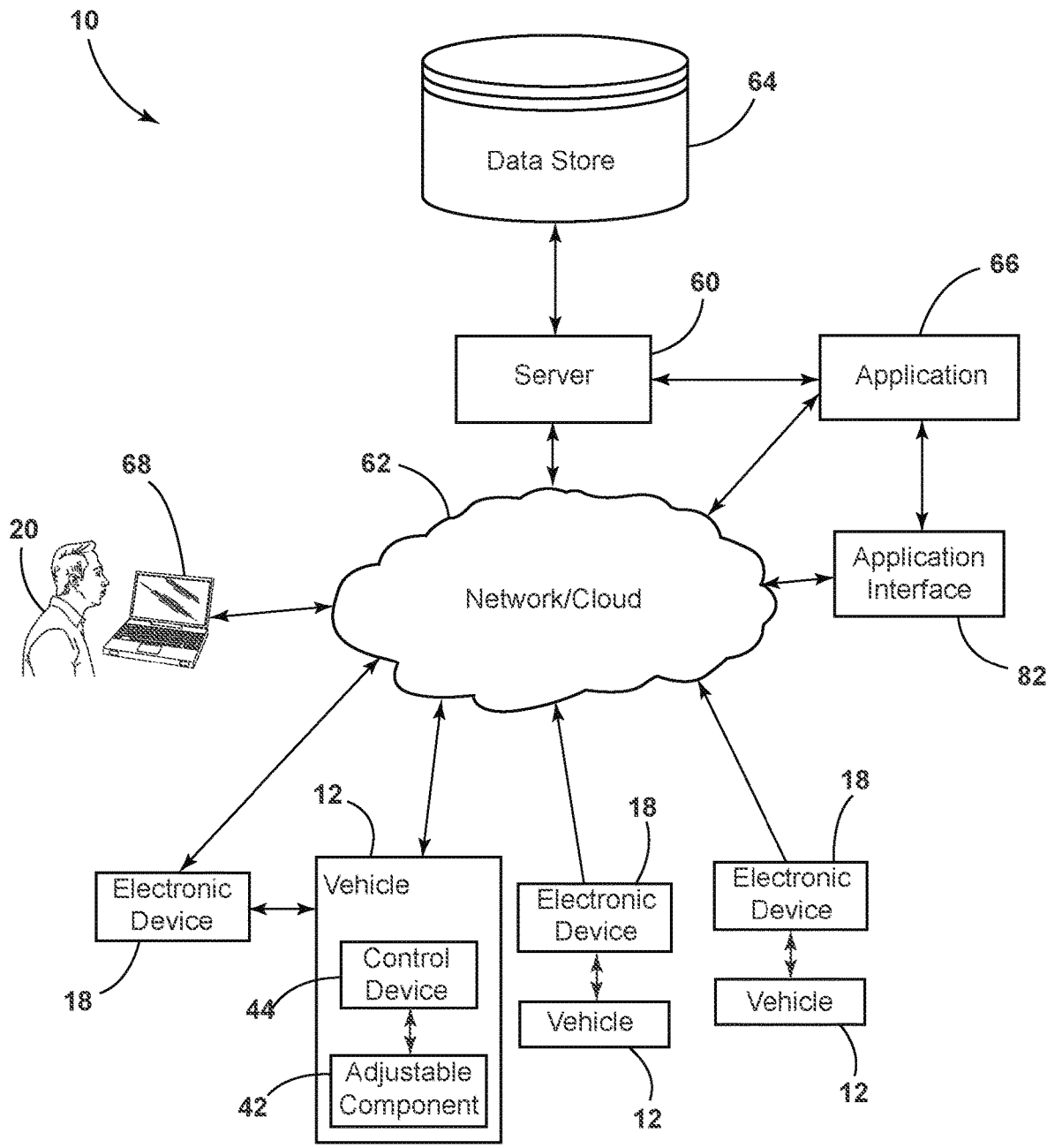
FIG. 4 is a block diagram illustrating a plurality of electronic devices operably coupled with a remote server in accordance with aspects of the present subject matter.

As will be described in greater detail below, any of the electronic devices 18 may be configured to communicate with a remote server 60 (FIG. 4) through a network/cloud 62 (FIG. 4). In such instances, the electronic device 18 may be configured as a dummy device that may provide data to the network and/or receive any instructions, notifications, alerts, and/or suggestions from the cloud 62. As such, in some instances, the electronic device 18 may be free of any one or more of the components provided herein. For example, in some instances, the electronic device 18 may be free of an integrated and/or individual processor(s) 30 and/or memory device(s) 32.

The one or more sensors 14 may be located within the electronic device 18 and/or operably coupled with the electronic device 18 and/or the vehicle 12 (possibly through the user 20). In operation, the one or more sensors 14 are configured to output data indicative of a measured position, a measured height, a measured pitch angle, a measured yaw angle, a measured pressure, and/or a measured roll angle of a portion of the vehicle 12 and/or the user 20 of the vehicle 12. Based on the signals, data is accumulated, which, in turn, can be used to detect various possible hazards of the vehicle 12. Based on the detected possible hazards, the memory may provide instructions to a user 20 related to mitigating a possible upcoming possible hazard and/or provide instructions for adjusting one or more components 42 (FIG. 4) of the vehicle 12 through a control device 44 along a route.

In some instances, the control device 44 may be integrated within the vehicle 12, a stand-alone device 26, integrated within the electronic device 18, and/or in any other location. The control device 44 is configured to alter one or more actuable components 42 of the vehicle 12. The actuation of the one or more actuable features may be based on received data from the one or more sensors 14, location data, weather data, and/or any other data.

In some embodiments, the one or more sensors 14 may be configured as an inertial measurement unit (IMU) that measures a specific force, angular rate, and/or an orientation of a portion of the vehicle 12 and/or the user 20 using a combination of accelerometers, gyroscopes, magnetometers, and/or any other practicable device. The accelerometer and/or the gyroscope may correspond to one or more multi-axis detection devices (e.g., one or more two-axis or threeaxis accelerometers and/or gyroscopes) such that the accelerometer may be configured to monitor the acceleration of the vehicle 12 in multiple directions, such as by sensing the vehicle acceleration along three different axes. It will be appreciated, however, that the accelerometer may generally correspond to any suitable type of accelerometer without departing from the teachings provided herein.

With further reference to FIG. 3, in accordance with aspects of the present disclosure, the one or more sensors 14 may additionally or alternatively correspond to an image sensor. In various embodiments, the image sensors may correspond to a stereographic camera having two or more lenses with a separate image sensor for each lens to allow the camera to capture stereographic or three-dimensional images. However, in alternative embodiments, the image sensors may correspond to any other suitable sensing devices configured to capture image or image-like data, such as a monocular camera, a LIDAR sensors, and/or a RADAR sensors.

As provided in FIG. 3, in instances in which at least one of the one or more sensors includes at least one image sensor, the image sensor may be a standalone device and/or integrated into the electronic device. Further, in embodiments incorporating an image sensor, each image sensor may be coupled to or mounted on the vehicle 12, (e.g., on a handlebar, a frame, or any other practicable location) and/or operably attached to a user (e.g., through a harness, such as a chest harness and/or a helmet harness). The image sensor is configured to detect image data relating to a location of an object separated from the vehicle 12 at two instances with a defined time period between the two instances. As such, the electronic device 18 can calculate an acceleration, orientation, and movement direction of the vehicle 12 based on the image data. In some examples, the image sensor, or any other practicable sensor, may be used to generate and/or create a map of a terrain that users 20 ride over. For instance, the image sensor, or any other practicable sensor, may map curves, drops, rises, and/or any other terrain feature. Based on the collected data, the terrain may be modeled and used to provide instructions in the form of suggestions, notifications, mitigation instructions, and/or instructions for a control device 44 for subsequent riders. Moreover, in some embodiments, the electronic device 18 may be operably coupled with an assembly that is capable of flight such that the data captured by the image sensor may also include aerial captured imagery. For example, the assembly may be configured as, but is not limited to, a drone, airplane, satellite, etc.

Further, in various embodiments, the sensors 14 may additionally or alternatively be configured as an ambient light sensor, barometer, microphone, pedometer, air humidity, thermometer, moisture, gesture, front proximity, rear proximity, hall effect, heart rate, RGB light, Geiger counter, and/or any other sensing device.

In several embodiments, the date/time module 38 maintains (or determines) a current date and time while the one or more sensors 14, the vehicle 12, and/or the electronic device 18 are in operation. The weather module 40 can be mounted to the vehicle 12, integrated within the electronic device 18, within the one or more sensors 14, and/or positioned in any other location. The weather module 40 can contain any device capable of monitoring one or more weather variables and/or any program configured for obtaining the one or more weather variables from a source, such as an additional application. For example, the weather module 40 can be implemented in hardware, software, or a suitable combination of hardware and software, and which can be one or more software systems operating on a general-purpose processor platform, a digital signal processor platform, or other suitable processors. As used herein, a software system can include one or more objects, agents, lines of code, threads, subroutines, databases, application programming interfaces (APIs), or other suitable data structures, source code (human-readable), object code (machine-readable), and can include two or more different lines of code or suitable data structures operating in two or more separate software applications, on two or more different processing platforms, or in other suitable architectures. In one exemplary embodiment, a software system can include one or more lines of code or other suitable software structures operating in a general-purpose software application, such as an operating system, and one or more lines of code or other suitable software structures operating in a specific purpose software application. In another exemplary embodiment, a software system can be implemented as a distributed software system, on a different processing platform than that shown in the exemplary embodiments herein, or in other suitable manners.

In several embodiments, the one or more weather variables can include, but are not limited to, temperature, wind speed, wind direction, relative humidity, barometric pressure, cloud cover, and trends thereof. In some instances, when the monitoring system 10 determines that a user 20 may be approaching an adverse weather condition and/or that an adverse weather condition is approaching the user 20 based on a planned route, trajectory, and/or user performance, the monitoring system 10 may generate instructions for the electronic device 18 to generate an alert. For example, the weather alert may be based on the monitoring system 10 knowing a user 20 is planning on a twenty-mile defined ride (e.g., a trail through the predefined park) and knowing that based on the user's trajectory and personal performance, the user 20 may be going to get caught in a storm. As such, the monitoring system 10 may provide an alert for a first user 20 and not for a second user 20. The alert may also include mitigation instructions that can include how to avoid the weather condition (which may include, but is not limited to, advising on route modification, or ending the ride before a particular time), mitigation instructions for operating the vehicle 12 in the adverse weather conditions, and/or minimizing the potential hazards of the weather condition.

The positioning device 36 may be configured to determine the location of the vehicle 12 and/or the user 20 by using a satellite navigation positioning device (e.g. a GPS, a Galileo positioning system, a Global Navigation satellite system (GLONASS), a BeiDou Satellite Navigation and Positioning system, a dead reckoning device, and/or the like). In such embodiments, the location determined by the positioning device 36 may be transmitted to the controller 28 (e.g., in the form location coordinates) and subsequently stored within the memory for subsequent processing and/or analysis.

In several embodiments, the location data stored within the memory device 32 may also be correlated to the data collected by the one or more sensors 14, the positioning device 36, the date/time module 38, the weather module 40, or any other device. For instance, in some embodiments, the location coordinates derived from the positioning device 36 and the data captured by the one or more sensors 14 and/or the weather module 40 may both be time-stamped. In such embodiments, the time-stamped data may allow each individual set of data captured by the one or more sensors 14 and/or the weather module 40 to be matched or correlated to a corresponding set of location coordinates received from the positioning device 36, thereby allowing the precise location associated with a given set of data to be known (or at least capable of calculation) by the controller 28.

The electronic device 18 (and/or the one or more sensors 14) may communicate via wired and/or wireless communication with the remote electronic devices 18 through a transceiver 70. The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), wide area networks (WAN), including the Internet, providing data communication services, Adaptive Network Topologies (ANT/ANT+), and/or one device that may be configured to communicate with multiple sensors/actuators and the like.

With further reference to FIG. 3, the electronic device 18 may provide instructions for various other components communicatively coupled with the electronic device 18 based on the results of the data analysis. For example, the electronic device 18 may provide a suggestion on how to operate the vehicle 12 and/or notification instructions to a user interface 52, lights 46, speakers 48, haptic devices 50, a remote electronic device 18, or any other device. In some examples, the user interface 52 may include a display 54 having a touchscreen 56. The display 54 may be capable of displaying information related to the current route, upcoming possible hazards, mitigation instructions, and/or any other information. In some embodiments, the user interface 52 may include a user input device in the form of circuitry 58 within the touchscreen 56 to receive an input corresponding with a location over the display 54. In some embodiments, the lights 46, speakers 48, haptic devices 50 may respectively prompt visual, auditory, and tactile notifications and/or warnings based on possible upcoming hazards.

Referring to FIG. 4, in some examples, the electronic device 18 may be communicatively coupled with one or more remote sites, such as a remote server 60 via a network/cloud 62 to provide data and/or other information therebetween. The network/cloud 62 represents one or more systems by which the electronic device 18 may communicate with the remote server 60. The network/cloud 62 may be one or more of various wired or wireless communication mechanisms, including any desired combination of wired and/or wireless communication mechanisms and any desired network topology (or topologies when multiple communication mechanisms are utilized). Exemplary communication networks 62 include wireless communication networks (e.g., using Bluetooth, IEEE 802.11, etc.), local area networks (LAN) and/or wide area networks (WAN), including the Internet and the Web, which may provide data communication services and/or cloud computing services. The Internet is generally a global data communications system. It is a hardware and software infrastructure that provides connectivity between computers. In contrast, the Web is generally one of the services communicated via the Internet. The Web is generally a collection of interconnected documents and other resources, linked by hyperlinks and URLs. In many technical illustrations when the precise location or interrelation of Internet resources are generally illustrated, extended networks such as the Internet are often depicted as a cloud (e.g. 62 in FIG. 4). The verbal image has been formalized in the newer concept of cloud computing. The National Institute of Standards and Technology (NIST) defines cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web, and cloud computing are not exactly the same, these terms are generally used interchangeably herein, and they may be referred to collectively as the network/cloud 62.

The server 60 may be one or more computer servers, each of which may include at least one processor and at least one memory, the memory storing instructions executable by the processor, including instructions for carrying out various steps and processes. The server 60 may include or be communicatively coupled to a data store 64 for storing collected data as well as for instructions for the electronic device 18 with or without intervention from a user 20 and/or the electronic device 18. Moreover, the server 60 may be capable of analyzing initial or raw sensor data received from the one or more electronic devices and final or post-processing data (as well as any intermediate data created during data processing). Accordingly, the instructions provided to any one or more of the electronic devices 18 may be determined and generated by the server 60 and/or one or more cloud-based applications 66. In such instances, the user interface 52 of the electronic device 18 may be a dummy device that provides various notifications based on instructions from the cloud 62.

With further reference to FIG. 4, the server 60 also generally implements features that may enable the electronic device 18 to communicate with cloud-based applications 66. Communications from the electronic device 18 can be directed through the network/cloud 62 to the server 60 and/or cloud-based applications 66 with or without a networking device, such as a router and/or modem. Additionally, communications from the cloud-based applications 66, even though these communications may indicate one of the electronic devices 18 as an intended recipient, can also be directed to the server 60. The cloud-based applications 66 are generally any appropriate services or applications 66 that are accessible through any part of the network/cloud 62 and may be capable of interacting with the electronic device 18.

In various examples, the electronic device 18 can be feature-rich with respect to communication capabilities, i.e. have built-in capabilities to access the network/cloud 62 and any of the cloud-based applications 66 or can be loaded with, or programmed to have, such capabilities. The electronic device 18 can also access any part of the network/cloud 62 through industry-standard wired or wireless access points, cell phone cells, or network nodes. In some examples, users 20 can register to use the remote server 60 through the electronic device 18, which may provide access to the electronic device 18 and/or thereby allow the server 60 to communicate directly or indirectly with the electronic device 18. In various instances, the electronic device 18 may also communicate directly, or indirectly, with the electronic device 18 or one of the cloud-based applications 66 in addition to communicating with or through the server 60. According to some examples, the electronic device 18 can be preconfigured at the time of manufacture with a communication address (e.g. a URL, an IP address, etc.) for communicating with the server 60 and may or may not have the ability to upgrade or change or add to the preconfigured communication address.

Referring still to FIG. 4, when a new cloud-based application 66 is developed and introduced, the server 60 can be upgraded to be able to receive communications for the new cloud-based application 66 and to translate communications between the new protocol and the protocol used by the electronic device 18. The flexibility, scalability, and upgradeability of current server technology render the task of adding new cloud-based application protocols to the server 60 relatively quick and easy.

In several embodiments, an application interface 82 may be operably coupled with the cloud 62 and/or the application 66. The application interface 82 may be configured to receive data related to a predefined boundary such that a user 20 may obtain information on the predefined boundary based on the inputted data. It will be appreciated that any person, entity, or device can supply inputs to the data store 64 through the application interface 82 for users 20 to benefit from. For example, a location for a trail, park, route, and/or other location may be entered through the application interface 82. In addition, various terrain features within the location may be identified. Further, one or more terrain feature mitigations may also be entered through the application interface 82. In addition, the monitoring system 10 may be used for various other activities such as skiing. In such instances, a skier may be warned of various terrain features and/or how to mitigate various terrain features based on the location of the electronic device 18 and/or the one or more sensors 14. In some instances, the application interface 82 can allow users to upload other fitness application history from other systems to the cloud 62 and/or the electronic device 18 of the monitoring system 10.

In various embodiments, one of more upcoming, scheduled, or unscheduled conditions may be provided to the application interface 82. For example, a public office, company, or other persons may access the application interface 82 to enter upcoming road construction and/or any other planned or unplanned (but occurring) event (e.g., a planned parade, strike, protest, etc.). In response, the monitoring system 10 may update the notifications and trail/road suggestions that it provides based on the upcoming conditions. Moreover, the public office or company may access various components of the data (as recipients as opposed to providers of the data) within the monitoring system 10 to determine where there are terrain features (i.e. potholes), congestion zones, heavy amounts of riders, etc. This may enable the public office, company, or other persons to do things like determining if they want to add bicycle lanes, change traffic light timing, or resolve terrain features (i.e. potholes, storm drains, etc.).

In some instances, the monitoring system 10 may enable multiple layers of selection for the user 20. For example, a user 20 may choose between a first layer, which may include all inputted data through the application interface 82 and/or through data collected from one or more users 20. In addition, the user 20 may choose a second layer of data (e.g., platform data), which may include advanced user data and advanced mitigation suggestions. Additionally or alternatively, the user 20 may also choose a third layer of data, which may be data from a single source, which may be received through the application interface 82 and/or a single electronic device. The user 20 can select any/all the layers they want to be communicated to them. The application interface 82 can be implemented in hardware, software, or a suitable combination of hardware and software, and which can be one or more software systems operating on a general-purpose processor platform, a digital signal processor platform, or other suitable processors.

In various examples, the application interface 82 may be operably coupled with a display that may be positioned along one or more routes. In such instances, the display may be communicatively coupled with the network/cloud 62. In addition, the display may provide any information of interest. In various examples, the display may be configured as a device that may capture and provide data to the network and/or receive any instructions, notifications, alerts, and/or suggestions from the cloud 62. In several examples, the device may be generally static during use (e.g., a display with a camera) or mobile during use (e.g., drone) and can actually detect adverse riding conditions and subsequently offer mitigation to upcoming riders. In some instances, the display may be free of any one or more of the components provided herein. For example, in some instances, the display may be free of an integrated and/or individual processor(s) and/or memory device(s).

In some examples, the data may be inputted, detected, and/or recorded through the electronic device 18 and relayed to the server 60. The data may be stored in the server 60 and/or the data store 64. At various predefined periods and/or times, the electronic device 18 may communicate with the server 60 through the network/cloud 62 to obtain the stored instructions, if any exist. Upon receiving the stored instructions, the electronic device 18 may implement the instructions. The server 60 may additionally store information related to multiple electronic devices 18 and operate and/or provide instructions to the various electronic devices 18 in conjunction with the stored information with or without intervention from a user 20 and/or the electronic device 18. For example, any number of electronic devices 18, which may be operably coupled with respective vehicles 12 (such as bicycles 16), and users 20 can access the server 60 for storing and retrieving event-related data. In some instances, multiple electronic devices 18 on multiple vehicles 12 can send event-related data to the server 60 for storage in the data store 64. This collection of event-related data can be accessed by any number of users 20, and/or electronic devices 18 to assist with route planning, accident avoidance while riding the bicycle 16, and notifications of potentially dangerous areas along a route and may select a different route depending on the severity of the danger. While the vehicle 12 is being ridden along a route, the electronic device 18 may access the server 60 to identify upcoming areas where previous events occurred with different users 20 as detected through other electronic devices 18. The electronic device 18 can provide notification to the user 20 of vehicle 12 to be cautious in the upcoming area. For example, the electronic device 18 may provide a terrain feature mitigation notification that provides a suggestion to the user 20 of how to mitigate specific terrain features by advising the user 20 of what specific action(s) to take to safely overcome the upcoming terrain. For example, the electronic device 18 may provide a notification to a user 20 in the form of a suggestion to decrease a riding speed to a suggested speed and/or by a suggested percentage. In addition, as will be described in greater detail below, the electronic device 18 may additionally or alternatively map the terrain or trail and/or utilize mapped terrain trail to provide suggested routes and/or riding parameters through one or more augmented visual images/videos.

In some instances, a computing device 68 may also access the server 60 to obtain information related to stored events. The computing device 68 may be a mobile device, tablet computer, laptop computer, desktop computer, watch, virtual reality device, television, monitor, or any other computing device 68 or another visual device. The computing device 68 may be used to produce a simulated ride of a selected route such that a user 20 of the bicycle 16 may have an opportunity to review a route before attempting to ride the bicycle 16 along the route. The pre-ride preview may be based on previously captured sensor data and/or terrain mapping provided by one or more electronic devices 18 having their data uploaded to the cloud 62. The preview may output video captured and/or augmented visual imagery possibly with optimal line overlays that indicate poor riding paths and/or a suggested path. For instance, the overlaid sections may be indicated through one or more zones overlaid on a simulated and imaged route.

In various embodiments, the data used by the monitoring system 10, the electronic device 18 within the monitoring system 10, the remote server 60, the data store 64, the application 66, the application interface 82, the computing device 68, and/or any other component described herein for any purpose may be based on data provided by the one or more sensors 14 and/or third-party data that may be converted into comparable data that may be used independently or in conjunction with data collected from the one or more sensors 14. As discussed above, in various examples, the server may implement MLE methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the server 60 through the network/cloud 62 and may be used to generate a predictive evaluation of the information of interest.

In some embodiments, the monitoring system 10 can generate a custom report based on previously captured data for the user 20 to read and/or listen to so they understand the upcoming ride and terrain features. As such, the monitoring system 10 may allow a user 20 to prepare for a new trail or a trail that he/she has ridden many times to continuously learn and improve their personal safety on the trail. The monitoring system 10 can, therefore, enable users 20 of many skill sets to have more confidence and understanding of the trails they are about to enjoy, and be able to enjoy them while riding solo. Moreover, in some instances, highlights of high-risk terrain features based on the networked data collected from the user 20 that can be shared through the cloud 62 and leveraged to provide a user 20 additional information before experiencing the hazard.

Furthermore, the electronic device may be implemented within non-motorized and/or motorized vehicles and/or users, such that users can be notified of other users of the monitoring system (e.g., bikers, runners, walkers, etc.) in the area. As such, a driver or user may be provided with a notification when approaching an area that may have a fair number of monitoring system users and/or bikers/walkers/runners as identified through any other system that has been communicated with the network/cloud 62. In addition, the users of the monitoring system such as bikers/walkers/runners may also be notified if there are other users, including but not limited to motorized and non-motorized, in the area.

Additionally or alternatively, in various embodiments, the monitoring system 10 may recap how a user 20 navigated various hazards along a route compared to previous rides and/or others. A personalized summary and a scorecard denoting what a user 20 did well on versus did poorly on, and additional information can be offered. The summary and the scorecard may be based on selectable statistics or a predetermined statistical algorithm. For example, the scorecard may be based on the speed at which each hazard and/or a portion of the route was navigated, a number of times that the bicycle 16 was detected to encountered a hazard, a speed after a hazard, etc. Furthermore, in addition to the scorecard, rendered illustrations/clips of how the bicycle 16/user 20 moves during difficult or adverse riding conditions may be provided on the display 54 of the electronic device 18, the computing device 68, or any other device in the post-ride recap.

Additionally or alternatively, the monitoring system 10 can share data and/or ride information on social media overlaid with a route. For example, the monitoring system 10 may provide rendered and overlaid terrain feature data including specific areas where the user 20 traversed one or more terrain features. For example, a map of a trail and showing various icons (e.g., red, yellow, and/or green icons) denoting where the user 20 did poorly and where they did well. In some embodiments, the monitoring system 10 may include the user's captured information, another user's information, or broadly available information (i.e. sensor captured and/or visual captured data and rendered mapping). This may be shared both visually (i.e. on-screen) and/or audibly.

Additionally or alternatively, the monitoring system 10 can determine a carbon output of the vehicle and offer recommendations on carbon offset and/or optimization. The monitoring system 10 may further track carbon footprint variances between typical commuting and transportation modes in order to calculate carbon footprint savings.

Referring to FIGS. 5-8, through the use of the one or more sensors 14, the positioning device, the date/time module 38, and/or the weather module 40, the monitoring system 10 can identify, upload, and transmit possible hazards upcoming that may result in difficult or adverse riding conditions. For example, based on the collected data, the monitoring system 10 may determine the terrain features that result in a difficult or adverse riding condition while also understanding users 20 who have navigated that same terrain feature without incident to determine patterns. For example, various obstacles 72, such as boulders 74 (FIG. 5), roots 76 (FIG. 6), uphill/downhill variations 78 (FIG. 6), and/or any other obstacle that may be along a trail 80. This determination of which hazards generate a notification or a suggestion that may be based on data from the one or more sensors 14 that may be stored in the data store 64 (FIG. 4). Once the monitoring system 10 determines a particular event location in which a specified percentage of users 20 did have a difficult or adverse riding condition, the monitoring system 10 may mark that location and/or compute, from the data, a strategy for safely traversing the hazard from those who rode through successfully traversed the hazard to determine patterns of their behavior and then advise future users 20 based on that information. For example, if it is determined that those who had a difficult or adverse riding condition exceeded a particular speed, whereas those that safely traversed the hazed were below a particular speed, the monitoring system 10 may provide a suggestion to the user 20 to proceed at a speed below the particular speed. Other data may also be utilized, including but not limited to previous and immediate weather conditions.

In some examples, a difficult or adverse riding condition may be another upcoming user 20 (FIG. 5), on a one-way or on a two-way traffic trail 80 and/or where visibility is low (i.e. foliaged and/or steep terrain). In instances in which multiple users 20 are utilizing the monitoring system 10 at the same time, the users 20 may be notified of other users 20 in their path based on factors including but not limited to GPS location, directional bearing, and speed. The other users in their path may include both mobile and immobile users, and the instructions provided by the monitoring system 10 may be adjusted based on the type of user (immobile or mobile). For example, a user, such as a rider or a skier, may be notified of another upcoming user (e.g., immobile rider or skier) in their path.

In various embodiments, as provided herein, the monitoring system 10 may compute an upcoming difficult or adverse riding condition based on several different algorithms, such as but not limited to when the positioning device 36 determines that the vehicle 12 has stopped and/or when there is a severe or quick change in the accelerometer and/or gyroscope data, which may happen over a defined period of time. This information may then be uploaded to the data store 64 via a cloud transfer and may be able to be utilized for upcoming users 20. Other data may also be utilized, including by not limited to previous and immediate weather conditions through the weather module 40 and the positioning device 36. For example, various terrain features may result in more difficult or adverse riding conditions on dry days, whereas other terrain features may result in more difficult or adverse riding conditions on wet days. Furthermore, various terrain features may be identified through the use of the one or more sensors 14 to better offer mitigation instructions. In addition to the sensor data, the monitoring system 10 may also utilize existing and future images and videos, including but not limited to augmented visual images, for various functions provided by the monitoring system 10. For example, if imagery shows a sharp and sudden turn on the trail 80 or a road that is preceded by a steep decline, the monitoring system 10 may recommend the user 20 slow down to mitigate a likely event. Additionally, the monitoring system 10 may utilize augmented visual images/videos to suggest optimal riding lines based on estimated risk levels (e.g., green—low risk, yellow—medium risk, red—high risk).

In some instances, the monitoring system 10 may allow a user-selected level for terrain feature mitigation recommendations and/or be automatically determined based on collected data from a specific user 20. For example, a level 1 user 20, or a beginner, may be notified of an upcoming hazard in which 20% of people have a difficult or adverse riding condition, a level 2 ride, or an intermediate user 20, may be notified of an upcoming hazard in which 50% of people have a difficult or adverse riding condition, and level 3 user, or an expert user 20, may be notified of an upcoming hazard in which 80% of people have a difficult or adverse riding condition. Accordingly, the expert user 20 may select level 3 to block out the 'noise' from novice users 20 and only be notified of terrain feature mitigation that is creating a difficult or adverse riding condition to the majority of users 20 who most likely are of an advanced skill set.

The monitoring system 10 may also enable user-specific machine learning to offer terrain feature mitigation not just based on everyone's data, but also specific to that user 20 and/or their bicycle 16 and/or sensors 14. For example, it may be that shorter users 20 with smaller bicycles 16 are less likely to need terrain feature mitigation on technical turns since they are more agile than taller users 20 with larger bicycles 16. This machine learning may optimize based on user-selected inputs (i.e. A user 20 inputting their height) and/or automatic learning that is done via machine learning. Using the aforementioned example of a taller user 20 with a larger bicycle 16 possibly needing a disproportionate amount of terrain feature mitigation, the algorithm may not need to know that they are taller; rather, based on their ride characteristics, it would know that this particular user 20 tends to not do as well on more technical terrain.

Figure 7:
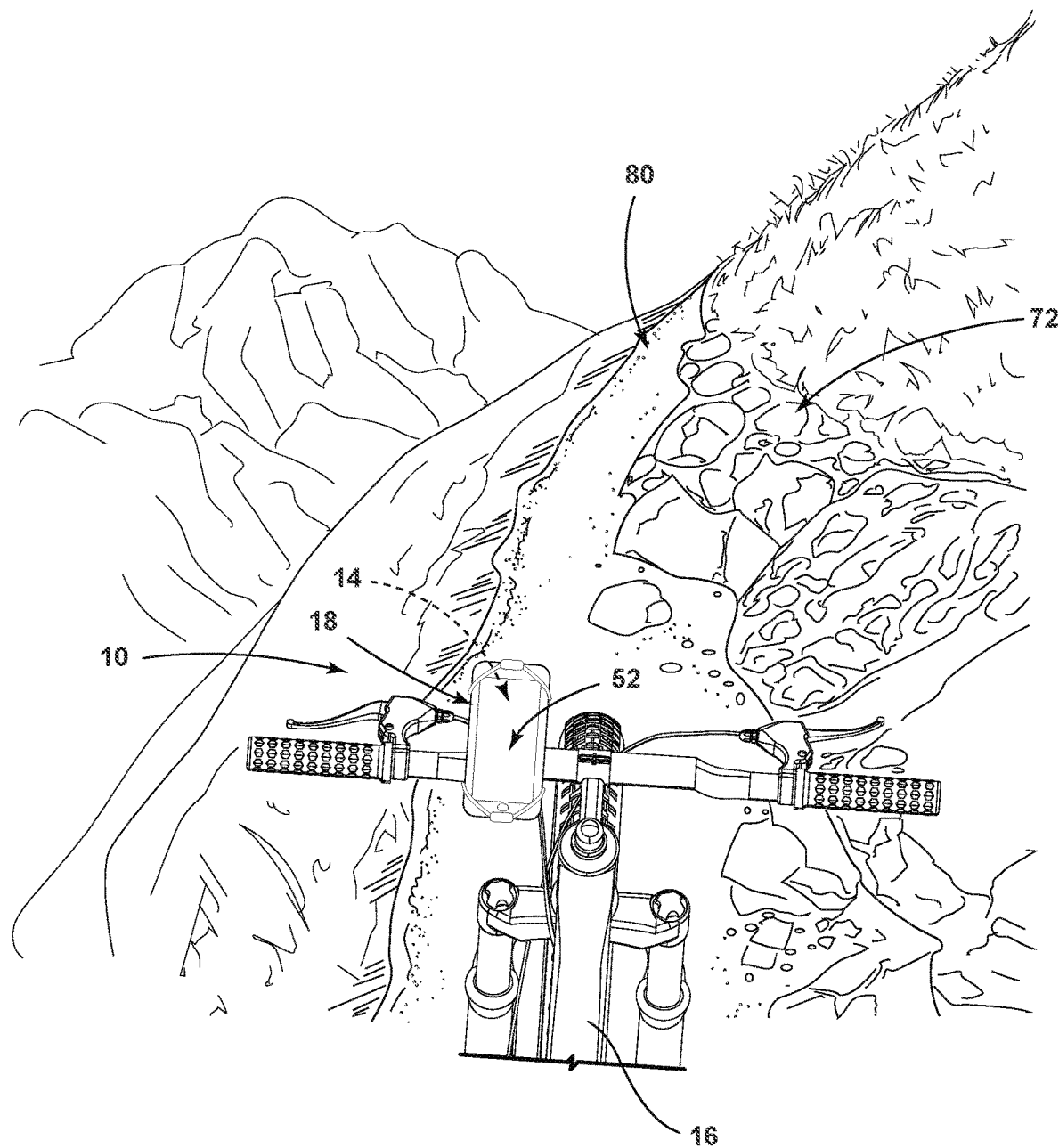
FIG. 7 is a perspective view of a trail forwardly of the bicycle in accordance with aspects of the present subject matter.
Figure 8:
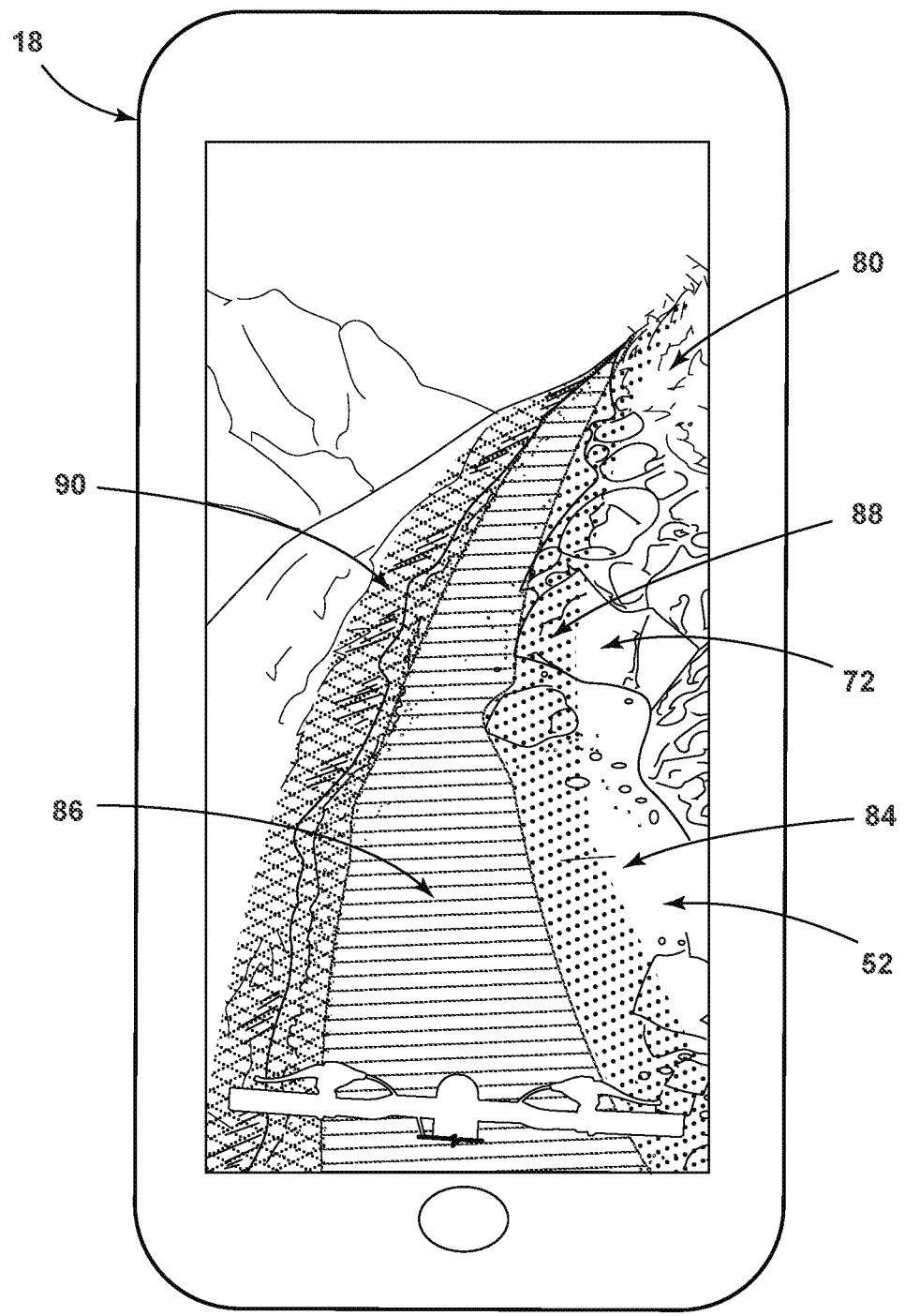
FIG. 8 is an exemplary image on a display illustrating various suggested routes along a trail in accordance with aspects of the present subject matter.

With further reference to FIGS. 7 and 8, in some embodiments, terrain mapping may be accomplished through the data collected from the one or more sensors 14, the positioning device, the date/time module 38, and/or the weather module 40 that can be used to create a multi-dimensional rendering with numerical values and/or assessments to denote the terrain. Moreover, the data used for the rendering may additionally or alternatively be based on third-party data, which may be converted into comparable data that may be used independently or in conjunction with data collected from the one or more sensors 14. The rendering may be in the form of a multi-dimensional, virtual, planimetric, topographic, thematic, navigation charts, and/or any other type of map or chart. Based on the terrain rendering and/or any other information or data, the monitoring system 10 may be configured to produce a graphic 84 on the display 54 (or anywhere else). As provided herein, the rendering and the graphic 84 produced from the rendering may be created by the server 60 and/or a remote application 66 that is provided to the electronic device 18 through the cloud 62.

In some instances, the graphic 84 may be used to communicate (i.e. visual, audible, haptic) to a user 20 of upcoming terrain including real imagery and/or the multi-dimensional rendered imagery. Furthermore, this may enable a user 20 to visualize different paths to take for hazard mitigation. As illustrated in FIG. 8, the graphic 84 may include overlaid graphics indicating suggested paths 86, 88, 90 based on a safe route, the fastest route, and/or any other desired route. Furthermore, a user 20 may select prior to or during a ride their chosen ride characteristics, which may include but not be limited to, an increased/reduced safety or speed characteristic for either for the entire ride or specific terrain feature(s).

In several embodiments, an imaging sensor mounted on the vehicle 12 and/or integrated within the electronic device 18 may collect data related to a front tire position of the vehicle 12 relative to the mapping data. In such instances, the overlaid graphics may be updated based on the current direction of a steered (e.g., a front) tire. For example, if a user is on a 4' wide trail and the right-hand side has obstacles 72, such as boulders 74, the optimal lines may be updated to traverse and/or avoid the obstacles 72.

In some instances, a specific group of users 20 may be able to optimize their ride based on terrain features and skill-sets of other users 20 within their group. For example, if three users 20 go out on a trail together, with one being the most capable rider, the three riders can form a group before the ride. One or more of the riders can have a full view of each rider's terrain mitigation characteristics to optimize around terrain feature mitigation for the entire group. For instance, a parent riding with his two children. The three individuals would form a group before the ride. The parent would have information (e.g., on a screen) that in addition to showing terrain feature mitigation for himself, would also show a real-time scorecard of how his children are mitigating terrain features. For example, the monitoring system 10 may show that the parent mitigated terrain features with a 90% success rate, whereas one of his children is mitigating terrain features at a 40% success rate (e.g., either crashing and/or landing jumps very harshly which may eventually result in a crash). The parent can then decide to adjust the desired route (e.g., do an easier trail) to mitigate terrain features and/or adjust speed amongst other factors on the existing trail. The monitoring system 10 may also advise the parent on the best mitigation for the group based on data provided by the one or more sensors 14 and/or the information stored within the monitoring system 10.

In various instances, the monitoring system may allow or enable a user to find and be matched with another user or users who share(s) the same locale (e.g., within a set number of miles from a defined boundary), have the same general abilities (including technical and/or fitness), tend to ride or traverse (including running, walking, hiking, etc.) similar distanced trails and/or roads, and/or ride or traverse during the same days/times (e.g., Saturdays between 10 and noon, which may be an editable field). This may be done either manually, automatically via the data collected and analyzed on the users via the neural network, or a combination of manual and automatic. In several embodiments, the monitoring system 10 may notify a user that other users are proximate and/or intend to ride or traverse a common trail or road such that the users may ride or traverse the trail or road at the same time.

Figure 9:
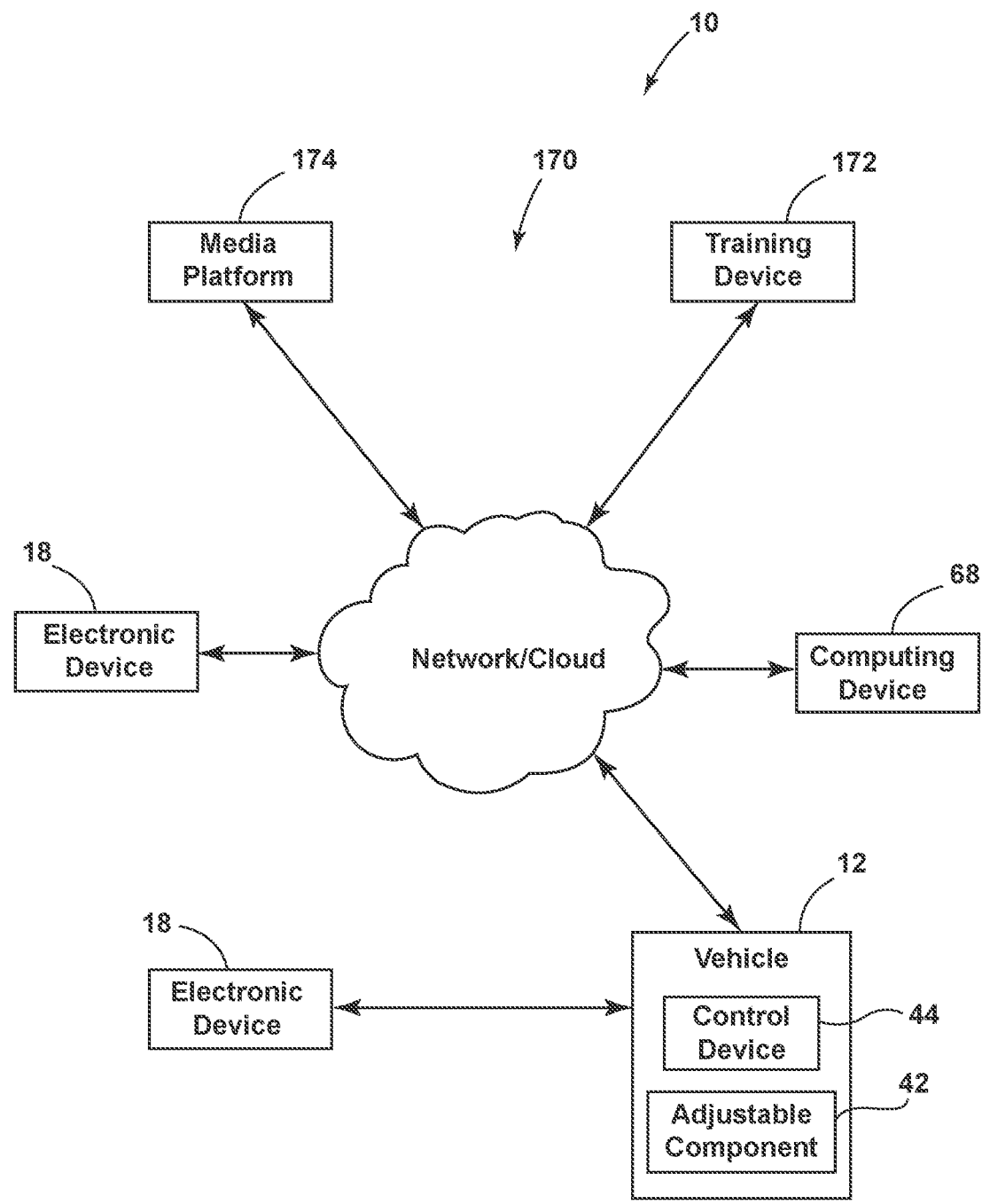
FIG. 9 is a block diagram illustrating a training system operably coupled with a remote server in accordance with aspects of the present subject matter.

Referring now to FIG. 9, in some examples, a user's captured information, another user's information, or broadly available information (i.e. sensor captured and/or visual captured data and rendered mapping) may be correlated to an operation routine for a training system 170. The training system may include a training device 172 in the form of spinning bicycles and/or smart trainers (including but not limited to smart bicycle trainers, smart treadmills, smart rowing devices, smart ellipticals, smart stair climbers, smart skiing machines) to enable virtual experiences. In various examples, the operation routine may be a route, a training module, and/or any other predefined experience. In some instances, an overall media platform 174 may be used to curate the one or more operation routines that may also enable users to upload/share and download/stream outdoor-oriented media and label it based on an activity, point of view (POV) video (i.e. first, second, drone), and include relevant smart course data. The operation routines of the training system 170 may include captured information, possibly further enabled with the POV video, another video, heart rate data, power meter data, cadence, telemetry, GPS data, and other data that can also be utilized to manually and/or dynamically create a course that may be used with the training device 172. For example, a user can ride a route with sensor captured and/or visual captured data. This data can then be used to create a course that will communicate with the training device and/or other output devices (i.e. television, laptop, tablet, mobile phone) to enable a user to ride the course within the comfort of their house or other location. In various embodiments, the electronic device 18 may provide the training system 170 with data for creating the operation routines. For example, the monitoring system 10 may provide the network/cloud with GPS coordinates, captured video footage, power information, cadence information, heart rate information, and/or any other information to a remote source (e.g., a data store 64, a computing device 68, an electronic device 18, etc.). Using the data provided from the electronic device 18, an operation routine may be dynamically created such that the route is created during the operation of the vehicle 12, without human intervention, and/or with minimal human intervention (e.g., some of the process is automated). Furthermore, a combination of a user's captured information, another user's information, or broadly available information (i.e., sensor captured and/or visual captured data and rendered mapping) may be uploaded/shared and downloaded/streamed and labeled based on an activity, a duration, a time of year, and/or any other feature. In various instances, the activity, the duration, the time of year, and/or any other feature may be detected and/or determined by the monitoring system 10. In other instances, the activity, the activity, the duration, the time of year, and/or any other feature may be inputted by the user.

Figure 10:
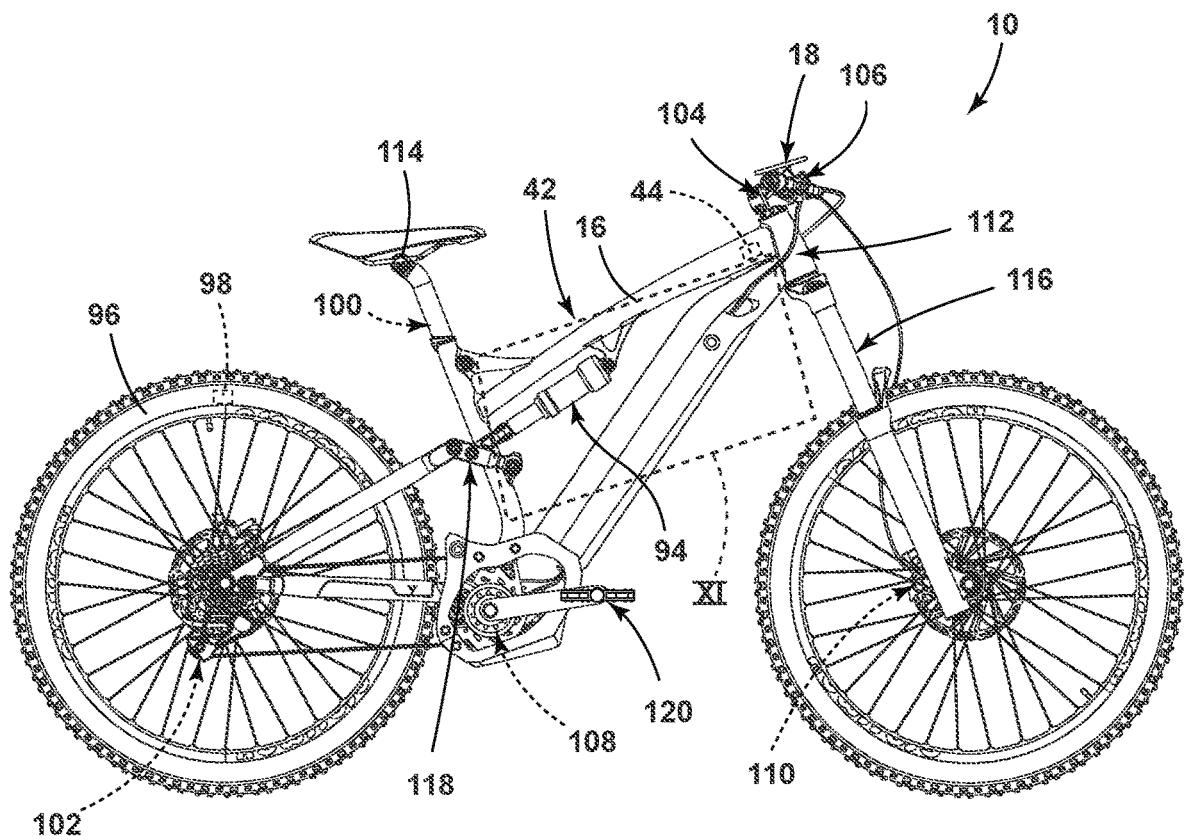
FIG. 10 is a side plan view of a bicycle incorporating various actuable components in accordance with aspects of the present subject matter.
Figure 11:
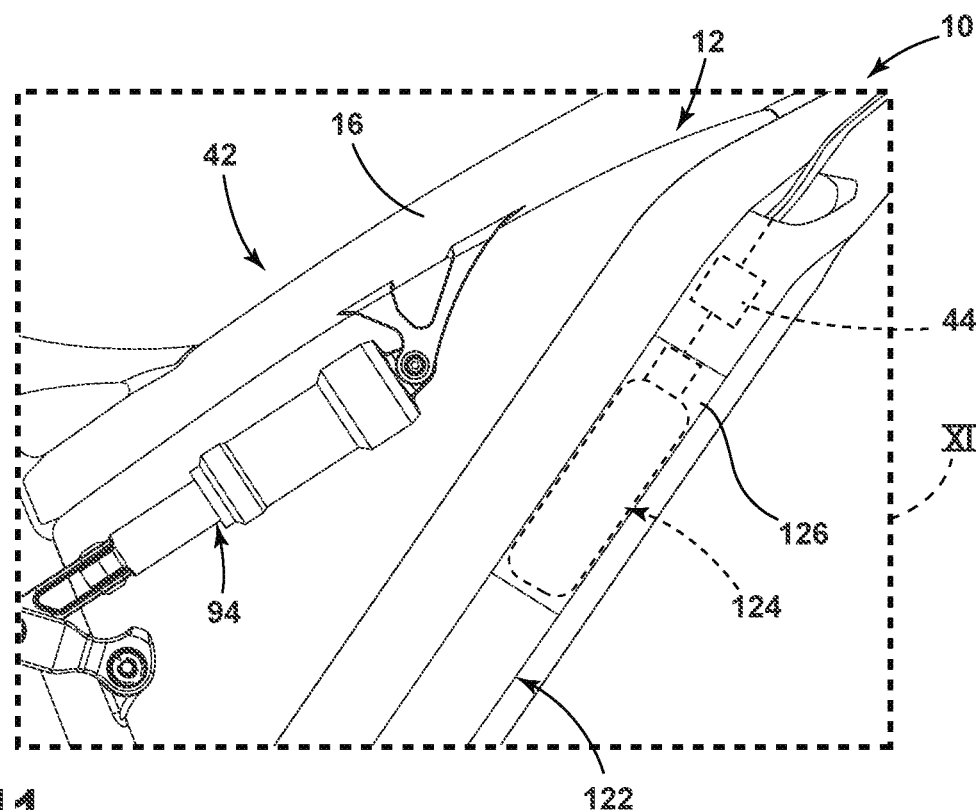
FIG. 11 is an enhanced view of area XI of FIG. 10 illustrating a compressed fluid chamber within the vehicle in accordance with aspects of the present subject matter.

Referring to FIG. 10, in some embodiments, utilizing manually-selected inputs (i.e. via the display 54, the electronic device 18, or audible cues), and/or sensor data, the monitoring system 10 may alter one or more components 42 of the bicycle 16 through the control device 44 to adapt the vehicle 12 to the terrain and/or the user capabilities. In various instances, the controller 28 may alter the one or more components 42 based on manual input resulting in a user-actuated experience (e.g. user interfaces with bicycle and states specific instructions for actuating geometry and/or other bicycle components, for example, a user 20 may audibly say "shift 2 gears up"). Additionally or alternatively, the monitoring system 10 may be capable of adjusting the one or more components 42 based on previously captured and/or current sensor data from any of the one or more sensors 14 in a semi-adaptive (e.g., with minimal user intervention, such as accepting a proposed alteration) and/or adaptive experience (e.g., with no user intervention). In some embodiments, certain components and/or geometry may be user-selected or predefined to be user-actuated, semi-adaptive, and/or adaptive.

In various instances, the control device 44 can alter any component of the vehicle 12, including but not limited to, a rear suspension assembly 94, tires 96 through an inflation/deflation system 98, dropper seat post 100, a derailleur assembly 102, a dynamic geometry configuration 104 that is configured to alter a geometry of the front of the bicycle, motor(s) 108, brakes 110, a height adjustment assembly 112 for altering a height of the handlebar 106, a seat adjustment device 114 that may allow for a manual or automatic change in the position of the seat, a front suspension assembly 116, a frame changing device 118 that is configured to alter a geometry of the rear triangle of the bicycle, a pedal assembly 120 that may manually or automatically decouple a shoe from the pedal based on instructions from the control device 44, and the like. In some instances, the pedal assembly 120 may detach a clip of a shoe from the pedal based on an upcoming terrain feature and/or when the one or more sensors 14 provides data indicating that the vehicle 12 may fall.

In some instances, the pedal assembly 120 may be a standalone component having one or more sensors 14 incorporated therein. In such instances, the pedal assembly 120 may be operably coupled with any bicycle, or other vehicle 12, as an add-on component that may be communicatively coupled with the electronic device 18 and/or the network/cloud 62. In some examples, the pedal assembly 120 can detach a clip of a shoe from the pedal based on an upcoming terrain feature, if a rider stops forward movement, and/or when the one or more sensors 14 provides data indicating that the vehicle 12 may fall.

In some embodiments, the adjustments may take place based on manual inputs, previously captured information, and/or real-time data. For example, by utilizing previously captured data, the bicycle 16 may adjust brake sensitivity and/or a tire pressure through a tire inflation system 98 to assist in mitigating various terrains and/or hazards. Additionally or alternatively, if the monitoring system 10 knows there is an inflection point in the trail 80 transitioning from downhill to a prolonged uphill climb based on previously captured data, or detects an inflection point in the trail 80 with real-time data transitioning from downhill to a prolonged uphill climb, the control device 44 can raise the dropper post 100 to increase energy transfer to the drivetrain and/or may automatically shift gears. In either case, the user 20 may not have to stop mid-ride to adjust seat post 100, but rather just keep riding. In the case of manual inputs, the user 20 may utilize the user interface 52 and/or use audible cues to tell the bicycle 16 to signal specific actuators. Furthermore, there will be the ability to customize and select specific presets (i.e. flat mode, uphill mode, downhill mode). For example in uphill mode, a single customized preset may adjust tire pressure, gears, and handlebar geometry simultaneously to a pre-specified value. Further, in some examples, the monitoring system 10 may utilize the cloud data store 64 and machine learning algorithms to assist in mitigating various terrains and/or hazards. Other data may also be utilized, including but not limited to previous and immediate weather conditions.

In some embodiments, the monitoring system 10 may further incorporate a digital optimizer, coach, and trail planner that can leverage the sensor data with the goal of optimizing a battery life, personal fitness attributes, human or motor 108 power output required or recommended to enable improved assist in mitigating various terrains and/or hazards. For example, based on knowing the upcoming terrain features and user characteristics, the monitoring system 10 may optimize the battery performance of the motor(s) 108 and/or other components 42 of the vehicle 12. The optimization may be done based on various criteria, including but not limited to performance, longevity, ride comfort, or speed. In some circumstances, the monitoring system 10 may also include battery optimization around inductive charging. For example, if the user 20 is going downhill and the monitoring system 10 recommends the user 20 slow down, it may do so automatically, and inductive charging would result thus extending battery longevity. Furthermore, the monitoring system 10 may enable a user 20 to mirror the riding behavior of another user 20 through visual, audible, and/or haptic feedback. For example, if a user 20 would like to ride a trail within a specified parameter of another user, the monitoring system 10 can instruct the user 20 to adjust speed, cadence, and other variables on noted terrain features. Furthermore, other variables include but are not limited to performance on specific terrain features, specific lines/routes taken, and other factors relative to another user 20.

Other sensors 14 including but not limited to heart rate, cadence, and power output both of the user 20 and other users 20, may be used to optimize one's ride. For example, if one's heartbeat is high on a flat section preceding an incline, the monitoring system 10 may recommend one to slow down and recoup before the strenuous upcoming climb. Furthermore, if another user 20 who previously rode the same trail had a similar heartbeat up to the aforementioned incline, and then stalled on the incline, the monitoring system 10 may offer guidance based on the probability of stalling for the upcoming user 20. The additional information may also be provided on the display 54 of the electronic device 18.

Referring now to FIGS. 10-18, in various instances, the monitoring system 10 may be configured to detect a riding characteristic of a user. The riding characteristic may be compared to any other rider and/or a group of riders, such as those identified as professional riders. Based on a comparison of the user's riding characteristic to any other rider and/or a group of riders, a suggested action may be provided to a user, and/or the vehicle 12 may be altered to compensate for the difference in riding characteristic. Additionally or alternatively, a scorecard may be produced for the user based on their riding characteristics and/or compared to any other rider, a group of riders, and/or a calculated optimal riding characteristic, which may be calculated based on data from any group of riders. The scorecard may be provided to a user post-ride that can include a tailored assessment and/or recommendation(s) on areas to improve for future ride(s).

For instance, the monitoring system 10 may determine and/or calculate a user's center of mass through the use of various sensors 14, including, but not limited to, sensors on pedal assemblies 120, handlebars 106, the body of a user, smart clothing (i.e. clip-on sensors or embedded into apparel), etc. In addition, the monitoring system 10 may also detect pedal angles of the pedal assembly 120 through any practicable sensor. The monitoring system 10 may further include proximity sensors mounted to the user and/or any vehicle component. Still further, the monitoring system 10 may also include sensors on the handles/handlebars 106 that detect a pressure sensitivity and/or moisture or sweat, etc. Once the monitoring system 10 collects data related to a user's center of mass, the monitoring system 10 may provide information relating to the user's center of mass and/or provide mitigation based on correlated information on other users who have successfully or unsuccessfully navigated the feature. For example, if on a given feature most users successfully navigate the feature within a specific parameter of body positioning, if the current user is outside of those parameters, the monitoring system 10 may offer mitigation guidance. Furthermore, in some embodiments, an additional user may automatically or manually instruct the user on suggested riding changes based on the additional user(s) center of mass in an attempt to replicate the additional user's center of mass through a common location (e.g., when the additional user and the current user are generally located in the same GPS coordinates). The center of mass imitation may be provided both to a monitoring system 10 in use and/or to a smart trainer.

In some instances, data may be sorted based on a metric, such as a user's ability on a specific feature or a broader set of features. The data within the metric may be compiled to form a platform layer of users (such as professional riders) and that data may be provided to a user of the monitoring system 10. For example, comparing a user's center of mass to that of the platform layer of users may enable the monitoring system 10 to provide suggestions based on compiled data and/or allow a real or virtual coach to offer suggestions based on the user's data and/or the platform layer of riders. The coach may also offer recommendations on specific features in which the user may benefit from another user's and/or platform. This feedback may be real-time (visual, haptic, audible) and/or provided afterward.

In some instances, the bicycle 16 may be able to adapt geometry and/or other bicycle components via user-actuated inputs. Furthermore, it may be able to adapt geometry and/or other bicycle components semi-adaptively or adaptively or to optimize around specific terrain features (e.g. change suspension based on current and upcoming terrain type) and/or having a less-than-ideal center of mass (e.g. either due to technical and/or physical limitations) and/or to accommodate a user which is not fully optimized (e.g. user will stall out on an incline if the user does not shift gears or motor does not kick in). For example, if a user is leaning too far forward on a jump, the bicycle may compensate by dropping the seat post and/or changing the suspension to reduce the probability of a crash upon landing. It will be appreciated that the compensation provided may be pre-defined and/or determined through the MLE discussed above.

In support of a user-actuated, semi-adaptive, and/or fully adaptive bicycle usage, the vehicle 12 may include one or more actuators that utilize any energy source 124 to alter a component of the vehicle 12. Additionally or alternatively, the energy source 124 may power any motors, sensors, electronic devices 18, lights, speakers, and/or any other powered device.

As provided herein, the one or more actuators may be operably coupled with a control device 44 for actuating each of the one or more actuators. The energy sources 124 may include, but are not limited to, to existing canisters (e.g., canisters containing compressed air/gases, nitrogen, carbon dioxide), electric/battery, air, springs/coils, thermal, solar/light, oil/gas, wind, inertia (including momentum). There may be a single energy source or a combination of multiple energy sources. The energy sources 124 may be contained in an assortment of locations on or within the bicycle including mounted to a component of the bicycle 16 and/or at least partially contained within a component of the bicycle 16, such as a tube 122 of the frame. In some instances, the energy source 124 may also be used as a form of energy for bicycle propulsion.

In some instances, the energy source 124 may be concealed within a housing 126. In some instances, the housing 126 may be integrated within a component of the bicycle 16, such as a tube 122 of the bicycle frame, and/or attached to a component of the vehicle 12. The housing 126 may include a cover 128 that is movable between a closed position in which the energy source 124 is at least partially concealed within the housing 126 and an open position in which the energy source 124 is accessible. It will be appreciated that in other examples, the bicycle 16 may be free of a housing 126, and the energy source 124 may be otherwise coupled with the bicycle 16. For example, a bracket may removably couple the energy source 124 to any portion of the bicycle 16.

In some embodiments, the bicycle 16 may incorporate a regenerative system in which the motor(s) 108 generates electric power with the rotational force of a wheel of the bicycle 16 and supplies the electric power to the energy source 124 or the like to convert kinetic energy into electric energy. In various examples, the motor(s) 108 performs power running as an electric motor during acceleration/driving of the bicycle 16 and performs regenerative running as an electric generator during deceleration of the bicycle 16. During the power running, the motor(s) 108 operates with the power supplied from an inverter unit operably coupled with the energy source 124 to the motor(s) 108 to generate the driving power for moving the bicycle 16. During the power running, the motor(s) 108 outputs driving torque as a driving force to the wheel of the bicycle 16. During the regenerative running, the motor(s) 108 generates the electric power with the rotational force transmitted from the wheel of the bicycle to the motor(s) 108. The electric power generated in the motor(s) 108 is charged into the energy source 124 via the inverter unit. During the regenerative running, the motor(s) 108 generates regenerative torque as a braking force applied to the wheel of the bicycle 16. It will be appreciated that the regenerative system may provide power and/or generate power based on manual input resulting in a user-actuated experience. Additionally or alternatively, the monitoring system may be capable of providing power and/or generating power based on previously captured and/or current sensor data from any of the one or more sensors in a semi-adaptive (e.g., with minimal user intervention, such as accepting a proposed alteration) and/or adaptive experience (e.g., with no user intervention).

Figure 12:
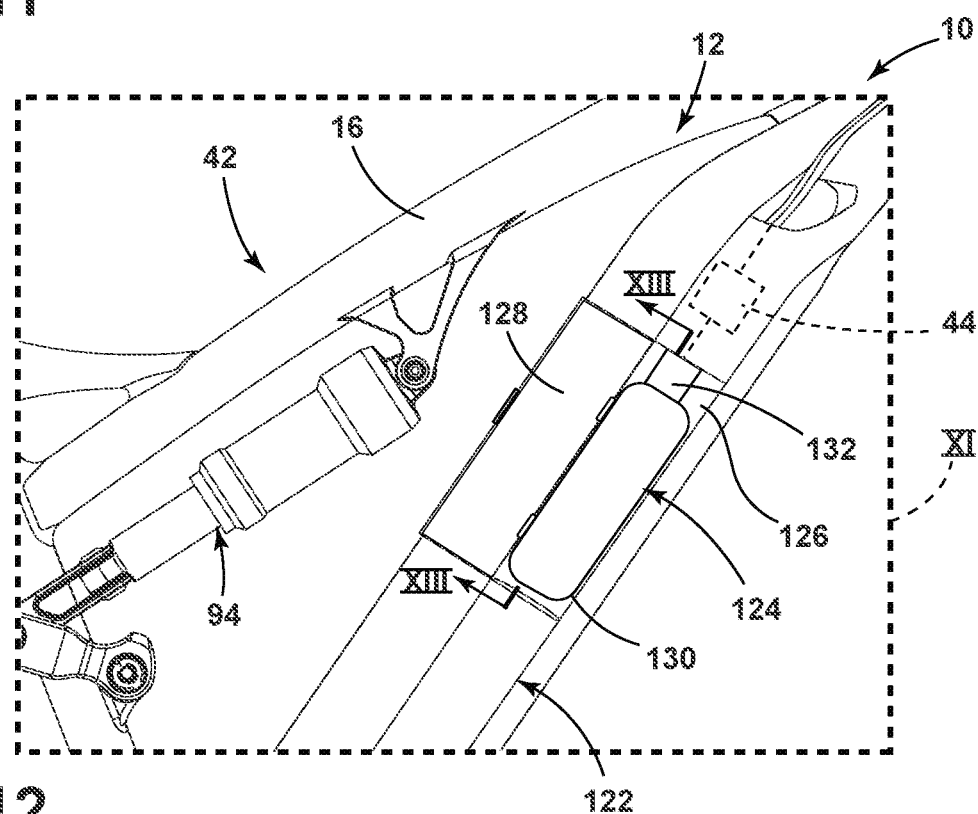
FIG. 12 is an enhanced view of area XI of FIG. 10 illustrating the compressed fluid chamber in the form of a removable chamber in accordance with aspects of the present subject matter.
Figure 13:
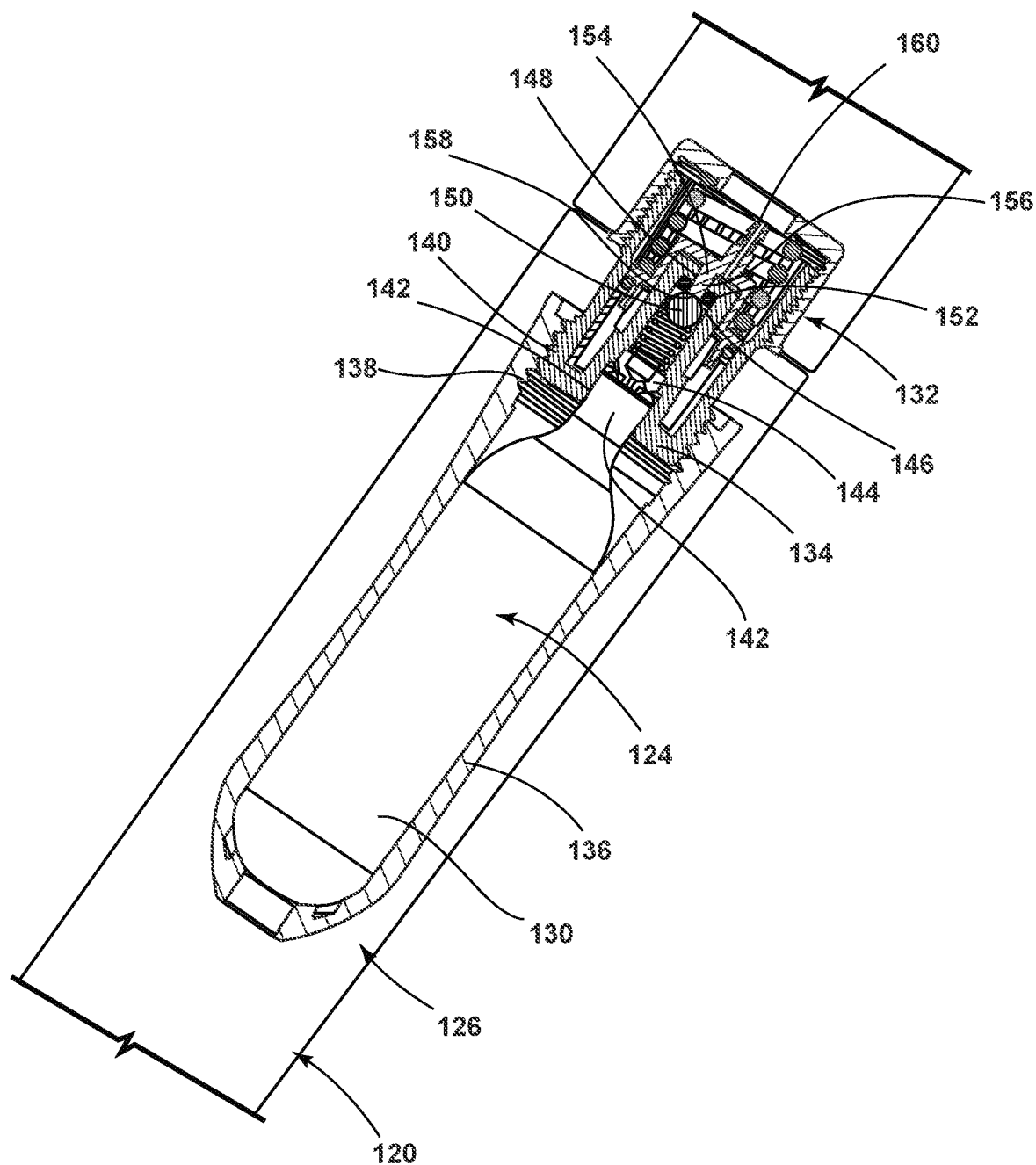
FIG. 13 is a cross-sectional view of the compressed fluid chamber taken along the line XIII-XIII of FIG. 13.

As illustrated in FIGS. 12 and 13, in some examples, the energy source 124 may be in the form of a compressed gas or fluid cartridge 130 that may be operably coupled to the bicycle 16. In some instances, the cartridge 130 may be removably coupled with a pressure regulator 132 that generally includes a regulator body 134. In the illustrated example, the cartridge 130 may be retained within a cartridge-retaining container 136 that operably couples with the regulator body 134. A female thread 138 may be present on the cartridge-retaining container 136 that mates with a male thread 140 that is formed as a feature on the regulator body 134. It will be appreciated, however, that the cartridge 130 may be operably coupled with the regulator 132 through any other method.

With further reference to FIG. 13, the compressed gas cartridge 130 defines a neck 142 that fits into a lance housing 144 that may be an integral feature of the pressure regulator 132. The lance housing 144 may be press-fit into the upstream end of a valve chamber 146 and may or may not puncture the compressed gas cartridge seal, distally located on the neck 142 when the same is brought into contact with the lance housing 144. A valve ball seat 148 extends into the valve chamber 146 to limit the motion of valve ball 150 during inoperative periods and high-pressure situations such that the sealing ring 152 is prevented from over-deformation and deformation by rigid ball seat 148 that supports valve ball 150 when the valve chamber 146 is closed, thereby enabling long-term containment of unused gas. Downstream from the valve ball seat 148 is a plunger channel 154. The plunger channel 154 is dimensioned to receive a plunger 156 that communicates at a contact interface 158 with the valve ball 150 to open the valve chamber 146. The plunger includes an exit conduit 160 of regulated pressure that directs compressed air to one or more actuators of the bicycle 16.

Figure 14:
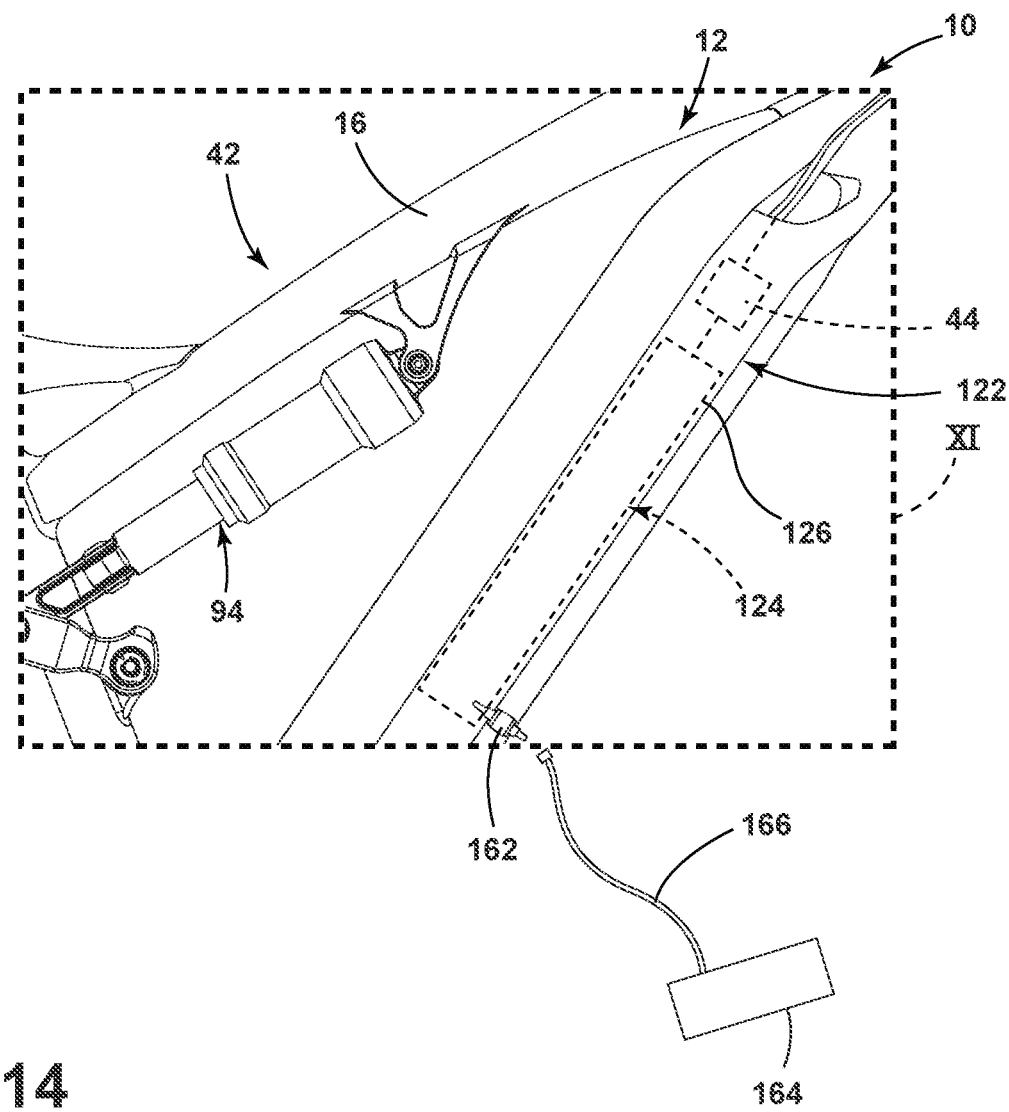
FIG. 14 is an enhanced view of area XI of FIG. 10 illustrating the compressed fluid chamber in the form of an integrated chamber in accordance with aspects of the present subject matter.

With reference to FIG. 14, the energy source 124 may be rechargeable and/or fillable through a connector 162. For example, in pressurized fluid implementations, the connector 162 may be capable of accepting a compressed fluid or air from the external energy source 164, which may be in the form of a pump, recharger, booster, inflator, compressor, etc.

Referring now to FIGS. 15-18, in some examples, the energy source 124 may be in the form of an electric power source 180, which may be in the form of a battery 182 that may be electrically coupled to the bicycle 16. The battery 182 may include a single or multiple cells 194 and have a housing 184, which may include a metal jacket, with a non-conductive coating, defining four sidewalls and top and bottom terminal boards 186, 188 defining the respective top and bottom surfaces. The battery 182 has positive and negative contact terminals 190, 192 assembled to the top terminal board 186. The teachings of the disclosure may be applicable to various multiple cell battery housings and various electrochemical cell configurations having a generally prismatic shape. Additionally, the present disclosure is not limited to the alkaline cell having manganese dioxide/zinc, as various other cells may be used, such as carbon/zinc, nickel-metal/hydride, nickel/cadmium, nickel/zinc, cells containing lithium, as well as other electrochemical cells. The cell of the present disclosure may be constructed as a bobbin type cell, a jelly roll type cell, or may incorporate flat plate construction.

Figure 15:
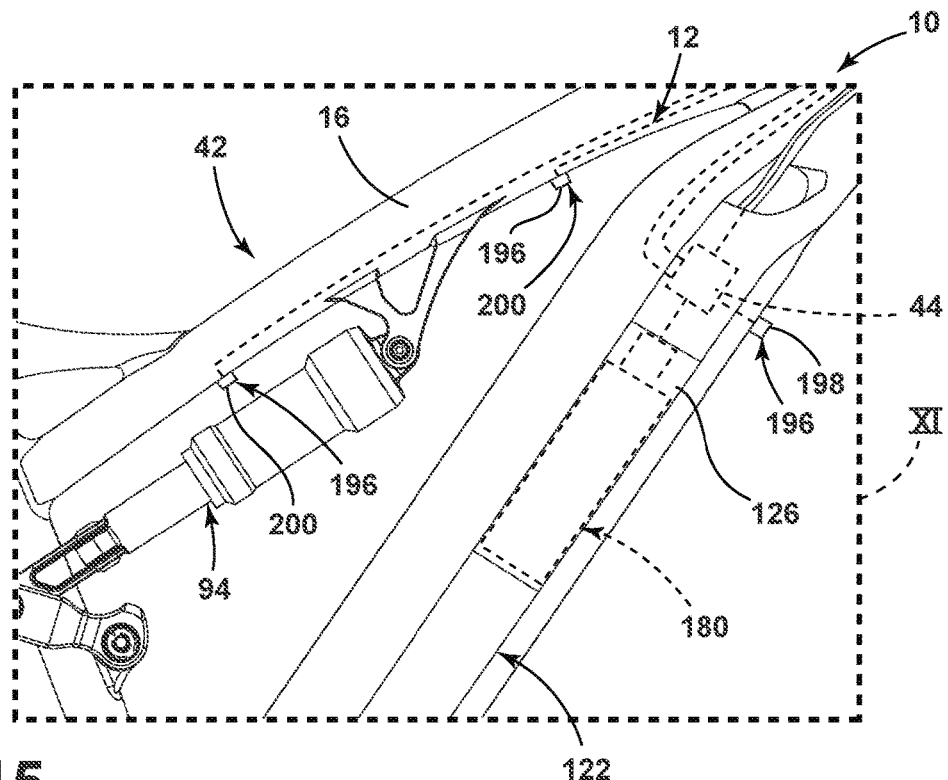
FIG. 15 is an enhanced view of area XI of FIG. 10 illustrating an electric power source within the vehicle in accordance with aspects of the present subject matter.
Figure 16:
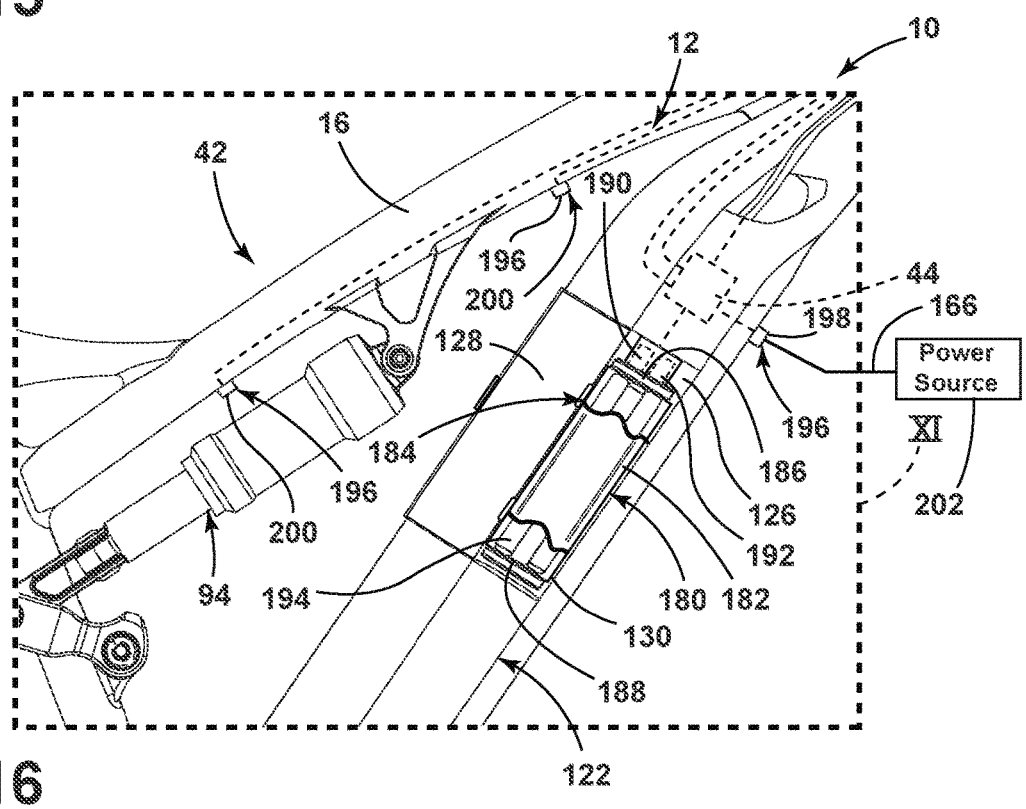
FIG. 16 is an enhanced view of area XI of FIG. 10 illustrating the electric power source in the form of a removable battery in accordance with aspects of the present subject matter.

As further illustrated in FIGS. 15 and 16, the bicycle 16 may include one or more electrical inputs 196, which may be configured to provide electrical power to the control device 44, the electric power source 180, and/or any other component. For example, the electrical input 196 may be in the form of a charging port 198 positioned along a tube 122 of the frame that is configured to couple the control device 44 with a conduit 166. The conduit 166 may be further coupled with an external power source 202 for directing electric power therefrom to the control device 44. From the control device, the electrical power may be directed to the battery 182 and/or to one or more components 42 of the bicycle 16. In some embodiments, the electric power may bypass the control device and be directly accepted by the battery 182 and/or the one or more components 42 of the bicycle 16.

In various embodiments, the control device 44 may include a battery management system that may determine a charge level of the battery 182 and direct electric power to the battery 182 based on the charge level. The charging protocol (how much voltage or current for how long, and what to do when charging is complete, for instance) of the battery management system can depend on the size and type of the battery 182 being charged. The battery management system may have temperature or voltage sensing circuits to safely adjust the charging current and voltage, determine the state of charge, and cut off at the end of charge. For instance, the battery management system may act as a trickle charger that provides a relatively small amount of current to the battery 182 that is idle for a long time.

While the bicycle 16 is in operation, the battery management system may be configured to provide power to various components 42 based on an order of priority when the battery management system determines that there is insufficient power to power each component 42. Moreover, a notification may be provided to the user when an estimated amount of power exceeds an amount of power within the battery 182 for a predefined route. Any notifications provided by the monitoring system 10 may be based on data from the battery management system and/or any other data. Moreover, the monitoring system may utilize any algorithm or method for determining a remaining charge of the battery 182.

Figure 17:
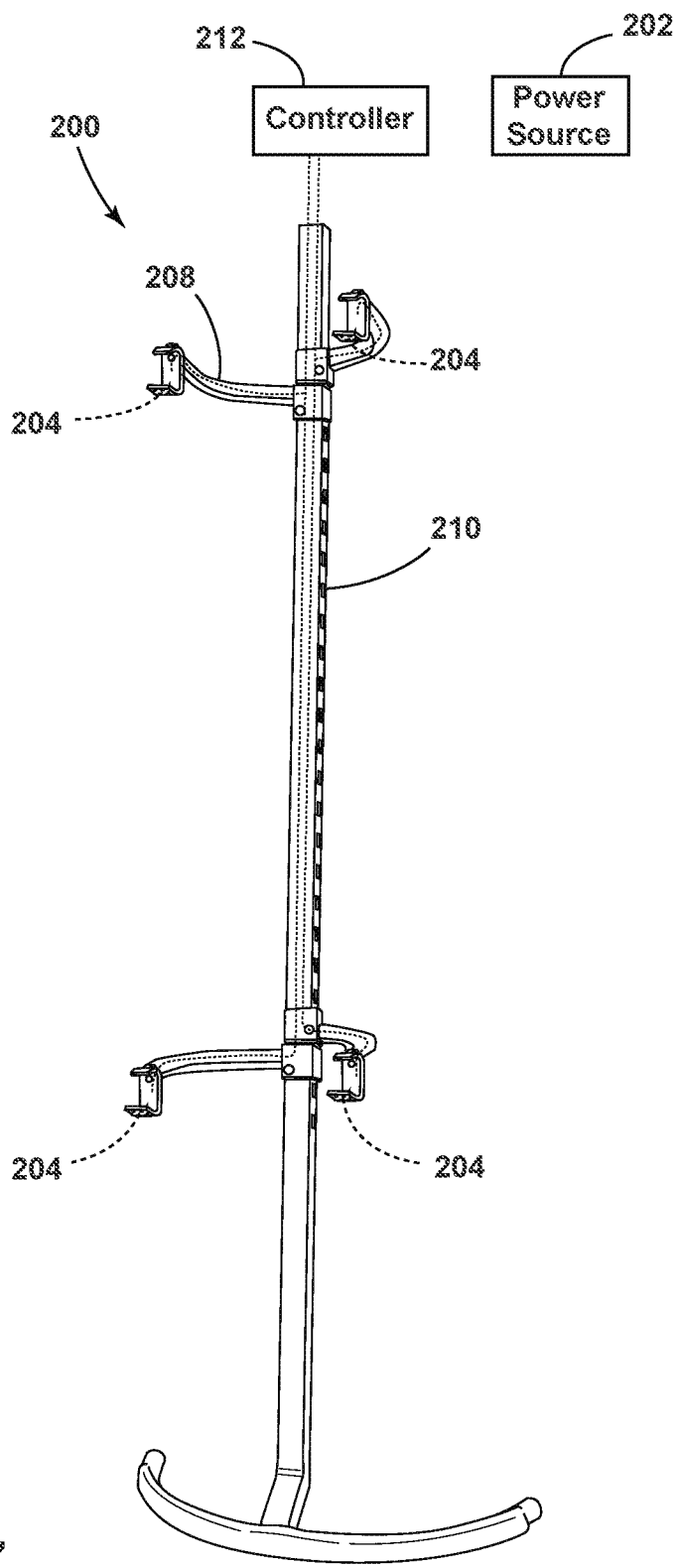
FIG. 17 is a perspective view of a bicycle rack in accordance with aspects of the present subject matter.

In various embodiments, in addition to or instead of the charging port 198, the electrical input 196 may be in the form of bicycle contacts 200. The bicycle contacts 200 may be configured to contact associated rack contacts 204 of a bicycle rack 206 for charging the battery 182 and/or actuating any of the components 42 of the bicycle 16. For example, as illustrated in FIG. 17, the bicycle rack 206 may be configured to store the bicycle 16 in a predefined boundary through a support arm 208 coupled to a base structure 210. As illustrated in FIG. 17, the support arm 208 may include the rack contacts 204 that align with the bicycle contacts 200. Each of the rack contacts 204 may be operably would with a rack controller 212 and/or an external power source 202. As such, when the bicycle 16 is positioned on the rack 206, the battery 182 may be charged. Alternatively or additionally, in some embodiments, the support arm 208 or base structure 210 may include a plug that can be used to charge the bike.

Figure 18:
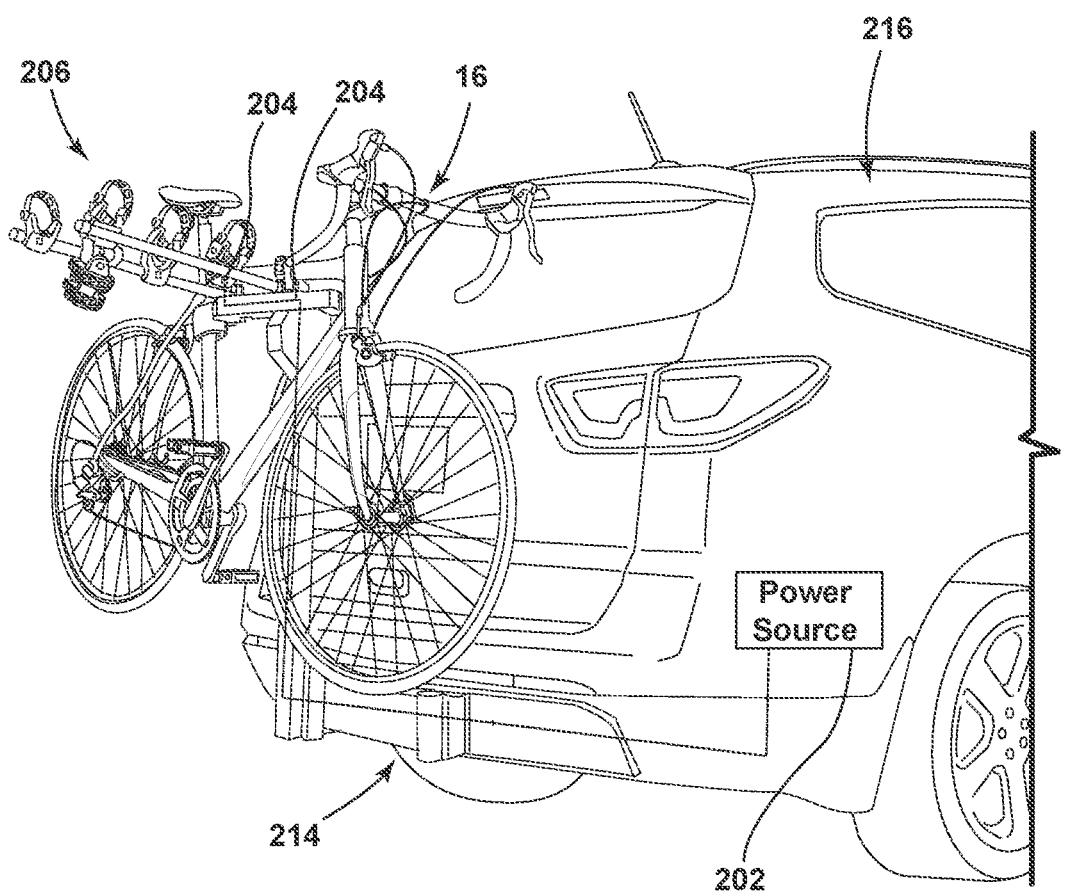
FIG. 18 is a perspective view of a bicycle rack in accordance with aspects of the present subject matter.

Additionally or alternatively, as illustrated in FIG. 18, the bicycle rack 206 may be configured as a vehicle bicycle rack. The vehicle bicycle rack 206 may be supported in any fashion, such as by straps and/or through a hitch 214 of a motorized vehicle 216. As provided herein, the rack 206 may include rack contacts 204 that electrically couple with the bicycle contacts 200. The rack contacts 204 may further be coupled with an external power source 202 of the vehicle to provide electrical power to the battery 182. In various embodiments, the external power source 202 may be an electric machine (e.g., alternator) within the motorized vehicle 216 that is coupled with an internal combustion engine and/or an electric vehicle or battery source of some sort. Alternatively or additionally, in some embodiments, the rack 206 may include a plug that can be used to charge the bike. Accordingly, while the bicycle 16 is on the stand-alone bicycle rack having a base structure 210 and/or a vehicle bicycle rack coupled to a motorized vehicle 216, the battery 182 of the bicycle 16 may be charged and/or one or more components 42 of the bicycle 16 may be actuated.

It will be understood by one having ordinary skill in the art that construction of the described invention and other components is not limited to any specific material. Other example examples of the invention disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

It is also noted that the construction and arrangement of the elements of the invention as shown in the examples are illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other example examples without departing from the spirit of the present innovations.

It will be understood that any described processes or steps within described processes may be combined with other disclosed processes or steps to form structures within the scope of the present invention. The example structures and processes disclosed herein are for illustrative purposes and are not to be construed as limiting. In addition, variations and modifications can be made on the aforementioned structures and methods without departing from the concepts of the present invention and such concepts are intended to be covered by the following claims unless these claims by their language expressly state otherwise.

What is claimed is:

1. A monitoring system comprising:
   an electronic device operably coupled with a bicycle;
   one or more sensors operably coupled with the electronic device;
   a user interface operably coupled with the electronic device, the user interface including a display; and
   a controller operably coupled with the electronic device, the controller configured to:
      receive data from the one or more sensors; and
      provide an instruction to the electronic device based on the data from the one or more sensors, wherein the instruction is provided through one or more overlaid graphics on the display is related to mitigating an upcoming information of interest along a route.

2. The monitoring system of claim 1, wherein the one or more sensors are integrated within a cellular device that is be removably attached to the bicycle.

3. The monitoring system of claim 1, wherein the instruction is for adjusting one or more components of the bicycle through a control device.

4. The monitoring system of claim 1, further comprising:
   a control device operably coupled with the controller, the control device configured to alter one or more actuable components of the bicycle.

5. The monitoring system of claim 4, wherein the control device is configured to alter a tire pressure of at least one tire of the bicycle through an inflation/deflation system.

6. The monitoring system of claim 4, wherein the actuable components includes at least one of a rear suspension assembly, a dynamic geometry configuration that is configured to alter a geometry of a front of the bicycle, a seat adjustment device, a front suspension assembly, or a pedal assembly.

7. The monitoring system of claim 1, further comprising:
   an application interface communicatively coupled with a network/cloud, wherein the information of interest is inputted through the application interface or the information of interest is received by the application interface through the network/cloud.

8. The monitoring system of claim 1, wherein the user interface is activated by a user to manually identify the information of interest, and wherein the controller is further configured to receive information from the user interface and provide the instruction to the electronic device based on the data from the one or more sensors and the information from the user interface.

9. The monitoring system of claim 8, wherein the one or more sensors is used to confirm the information of interest or vice versa.

10. The monitoring system of claim 1, wherein the controller is operably coupled with a machine learning engine to determine the instruction to be provided to the electronic device.

11. The monitoring system of claim 10, wherein the instruction is a first instruction or a second instruction, and wherein the machine learning engine is configured to provide the first instruction to a first individual based on data related to a characteristic and a second instruction to the second individual based on the data related to the characteristic.

12. A monitoring system comprising:
    a training system configured to enable virtual experiences;
    an electronic device operably coupled with a bicycle;
    one or more sensors operably coupled with the electronic device; and
    a controller operably coupled with the electronic device, the controller configured to:
       receive data from the one or more sensors as the bicycle traverses a route; and
       correlate the route to an operation routine for the training system based on the data received from the one or more sensors.

13. The monitoring system of claim 12, wherein the data includes video footage categorized by characteristics including at least one of an activity type, a duration, or a time of year.

14. The monitoring system of claim 12, wherein the controller is operably coupled with an overall media platform to curate the operation routine, and wherein each routine is labeled based on an activity and includes relevant smart course data.

15. The monitoring system of claim 14, wherein the electronic device is communicatively coupled with a network/cloud to transmit one or more of GPS coordinates, speed, acceleration, captured video footage, power information, cadence information, or heart rate information to a remote source.

16. The monitoring system of claim 12, wherein the operation routine is labeled based on an activity, point of view video, and the data from the one or more sensors, and wherein the operation routine is viewed remotely from the bicycle.

17. A monitoring system comprising:
    an electronic device operably coupled with a bicycle;
    a positioning device operably coupled with the electronic device;
    a user interface operably coupled with the electronic device; and
    a controller operably coupled with the electronic device and a database for storing data received from one or more sensors, the controller configured to:
       receive a location of the bicycle from the positioning device;
       determine one or more upcoming terrain features based on the location of the bicycle from the positioning device and the data received from one or more sensors; and
    display information related to the upcoming one or more upcoming terrain features on the user interface, wherein the information is at least partially based on a user-specific level of information.

18. The monitoring system of claim 17, wherein the user interface includes a display, and wherein the information related to the one or more upcoming terrain features includes one or more graphics to a user of the upcoming terrain.

19. The monitoring system of claim 18, further comprising:
- an imaging sensor mounted on the bicycle, wherein the data received from the one or more sensors includes at least mapping data and the imaging sensor is configured to collect data related to a front tire position of the bicycle relative to the mapping data, and wherein the display provides an image of the upcoming terrain and the information is configured as overlaid graphics on the image.

20. The monitoring system of claim 19, wherein the overlaid graphics are updated based on a current direction of a steered wheel of the bicycle.

* * * * *